(12) United States Patent
Watanuki et al.

(10) Patent No.: US 6,370,763 B1
(45) Date of Patent: *Apr. 16, 2002

(54) MANUFACTURING METHOD FOR MAGNETIC HEADS

(75) Inventors: Motoichi Watanuki; Tomokazu Sugiyama; Kazuo Yokoi; Yoshiaki Yanagida; Koji Suto, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/958,262

(22) Filed: Oct. 27, 1997

(30) Foreign Application Priority Data

Apr. 10, 1997 (JP) .............................................. 9-092458

(51) Int. Cl.[7] .......................... G11B 5/127; B24B 49/02
(52) U.S. Cl. ................. 29/603.09; 29/603.13; 29/603.1; 29/593; 451/8; 451/5; 360/314
(58) Field of Search ........................... 29/603.09, 603.1, 29/603.13, 593; 451/5, 1, 28, 8; 360/113, 314, 315

(56) References Cited

U.S. PATENT DOCUMENTS

| | | | | |
|---|---|---|---|---|
| 4,689,877 A | * | 9/1987 | Church ....................... 29/603.1 |
| 4,912,883 A | * | 4/1990 | Chang et al. .............. 51/165 R |
| 5,065,483 A | * | 11/1991 | Zammit ....................... 29/603.1 |
| 5,175,938 A | * | 1/1993 | Smith .......................... 29/603.1 |
| 5,331,495 A | * | 7/1994 | Yoshida et al. ............. 29/603.1 |
| 5,361,547 A | * | 11/1994 | Church et al. ................... 451/5 |
| 5,463,805 A | * | 11/1995 | Mowry et al. ............ 29/603.09 |
| 5,483,734 A | * | 1/1996 | Isono et al. .................... 29/593 |
| 5,609,511 A | * | 3/1997 | Moriyama et al. .............. 451/5 |
| 5,710,510 A | * | 1/1998 | Seagle et al. ............. 29/603.09 |
| 5,722,155 A | * | 3/1998 | Stover et al. ............... 29/603.1 |
| 5,738,566 A | * | 4/1998 | Li et al. ......................... 451/28 |
| 5,816,890 A | * | 10/1998 | Hao et al. ........................ 451/5 |
| 5,913,550 A | * | 6/1999 | Watanuki ................... 29/603.1 |
| 5,991,698 A | * | 11/1999 | Hao et al. ...................... 29/593 |

* cited by examiner

*Primary Examiner*—Lee Young
*Assistant Examiner*—A. Dexter Tugbang
(74) *Attorney, Agent, or Firm*—Greer, Burns & Crain, Ltd.

(57) ABSTRACT

Disclosed is a magnetic head manufacturing method for accurately measuring resistance value whereby magnetic heads are processed while measuring the resistance values of process monitoring element. After forming on a wafer magnetic head elements and monitoring element, in which resistance values change in analog fashion in line with processing, these elements are cut from the wafer. Next, the magnetic heads are processed to a prescribed height while measuring the resistance values of the monitoring element. In the forming process, the difference ΔI between the positions of the magnetic head elements and monitoring element is measured in advance, and this difference ΔI is used to convert the resistance values of the monitoring element to the height of the magnetic head elements. This makes it possible to correct errors in masks. Furthermore, patterns can be formed accurately by setting the position of the monitoring element to the same position as the magnetoresistive film of the magnetic heads.

9 Claims, 30 Drawing Sheets

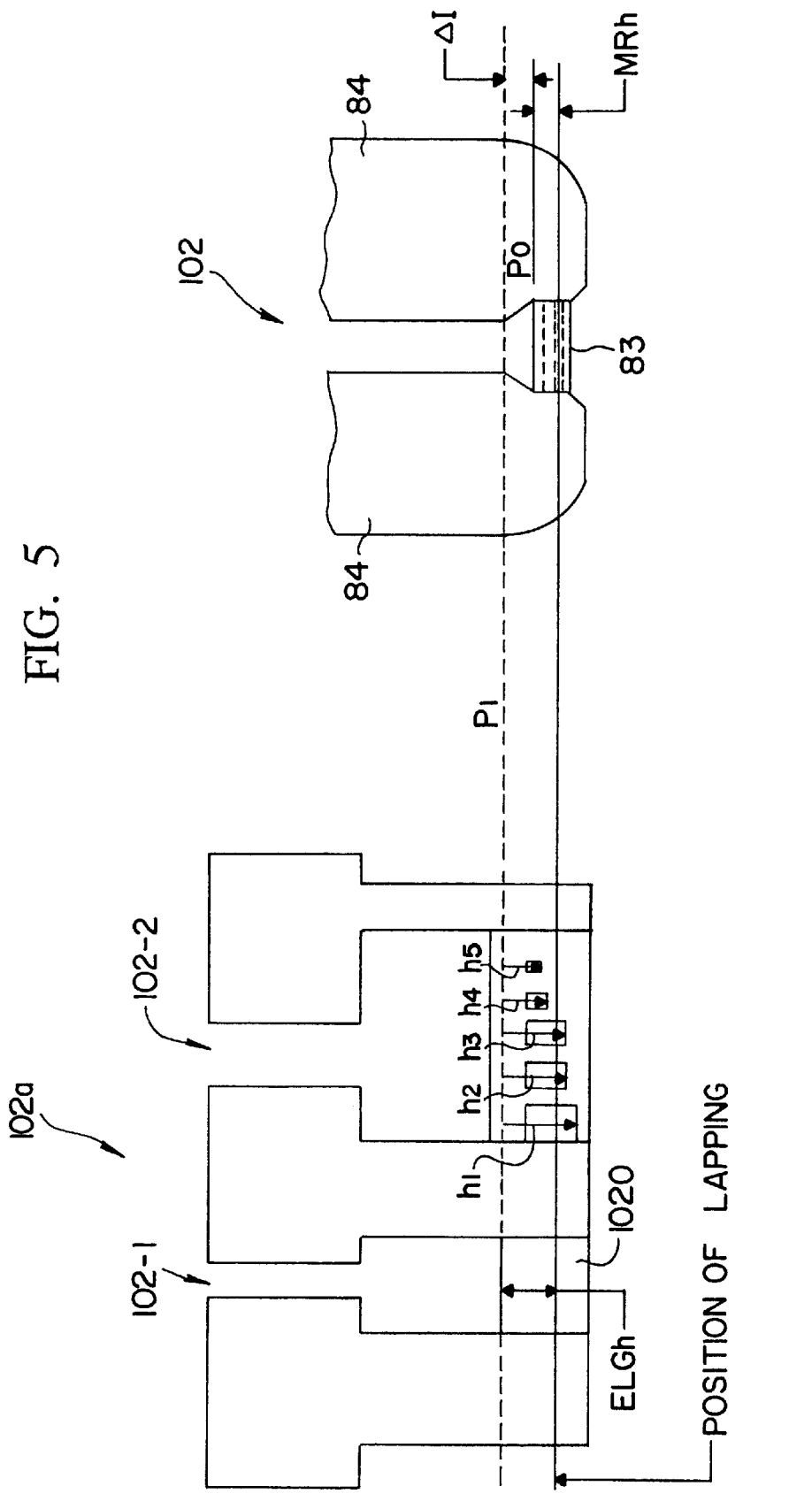

MANUFACTURING METHOD FOR MAGNETIC HEADS

BACKGROUND OF THE INVENTION

1. Field of the Invention

The present invention is related to a method for manufacturing magnetic heads for lapping magnetic head elements in order to make the height of the magnetic heads uniform after the magnetic head elements are formed on a wafer.

2. Description of the Related Art

In a magnetic head manufacturing process, after forming a magnetic head thin film, the magnetic head thin film is lapped. This lapping uniformly processes the gap length and magnetoresistive film of the magnetic head thin film. Submicron order precision is required for a magnetoresistive film and gap length.

FIG. 27A and FIG. 27B are schematic drawings of a merged magnetic head.

As shown in FIG. 27A, a merged magnetic head 80 comprises a magnetoresistive element 82 and writing element 85 formed on a substrate 81. As shown in FIG. 27B, the magnetoresistive element 82 comprises a magnetoresistive film 83 and a pair of conductors 84. The resistance value of the magnetoresistive element 82 changes in the presence of an external magnetic field. This magnetoresistive element 82 is a reading element, which outputs a current equivalent in strength to the magnetic force of a track 90 on a magnetic disk.

The magnetoresistive element 82 is only used for reading, requiring that a writing element be fabricated separately. The writing element 85 is configured as an inductive head. The writing element 85 comprises a bottom magnetic pole 86 and a top magnetic pole 88 that faces the bottom magnetic pole 86 across a gap. A coil 87, which excites these magnetic poles 86, 88 is fabricated between the magnetic poles 86, 88. A non-magnetic insulation layer 89 is fabricated around the coil 87.

In a merged magnetic head such as this, the resistance value of the magnetoresistive film 83 of the magnetoresistive element 82 must be constant for each head. However, in a magnetic head thin film manufacturing process, it is impossible to make this resistance value uniform. Consequently, after forming the magnetic head thin film, the magnetic head thin film is subjected to lapping in order to make the height (width) h of the magnetoresistive film 83 uniform thereby making the resistance values uniform.

FIGS. 28A to 29D provide schematic diagrams depicting the manufacturing process for such merged magnetic heads.

As shown in FIG. 28A, thin-film technology is used to form a plurality of merged magnetic heads 102 on a wafer 100. Then, as shown in FIG. 28B, the wafer 100 is cut into strips, creating row bars, (blocks) 101. A row bar 101 comprises one row of magnetic heads 102. And resistance elements 102a for process monitoring are formed on the left end, in the middle and on the right end of the row bar 101.

As explained previously, the magnetic heads 102 are lapped to make the height of the magnetoresistive film 83 uniform. However, the row bar is extremely thin, for example, around 0.3 millimeters. Consequently, it is impossible to mount it directly to the lapping jig. Consequently, as shown in FIG. 28C, a row bar 101 is bonded to a mounting jig (base) 103 using a heat-melted wax.

Then, as shown in FIG. 29A, the row bar 101 is placed on a lapping plate, and subjected to lapping. At this time, as pointed out in Japanese patent disclosure publication number 2-124262 (U.S. Pat. No. 5,023,991) and Japanese patent disclosure publication number 5-123960, the resistance values of the resistance elements 102a for monitoring the processing of the row bar 101 are constantly measured during lapping. Then, these resistance values are used to detect whether or not the magnetoresistive film 83 of the magnetic heads 102 has achieved the target height.

Lapping is terminated when the magnetoresistive film has been processed to the target height by the resistance value measurements. After that, as shown in FIG. 29B, a slider is formed on the bottom surface 101-1 of the row bar 101.

Also, as shown in FIG. 29C, the row bar 101 is cut into individual magnet heads 102 while it is attached to the mounting jig 103. Then, as illustrated in FIG. 29D, each magnetic head 102 is removed by heating the mounting jig 103 and melting the heat-melted wax.

A row bar 101 comprising a row of magnetic heads 102 is prepared in this way, and since lapping is performed in row bar units, the magnetoresistive film of a plurality of magnetic heads 102 can be lapped at the same time.

FIGS. 30A and 30B provides schematic diagrams depicting the prior art.

As shown in FIG. 30A, the row bar 101 comprises magnetic head elements 102 and monitoring elements 102a. The magnetic head elements 102, as described earlier, comprise a magnetoresistive film 83 and terminals 84. The monitoring elements (hereafter referred to as electrical lapping guide (ELG) elements) 102a comprise a resistance film 1020 and terminals 1021. This magnetoresistive film 83 and resistance film 1020 are formed from the same material.

As for this resistance film 1020, as shown in FIG. 30B, the lower the height ELGh of the resistance film 1020, the higher its resistance value. Therefore, the height ELGh of the resistance film 1020 can be detected by measuring the resistance value of the resistance film 1020 of the ELG elements 102a.

Since the height MRh of the magnetoresistive film 83 of the magnetic heads 102 is practically equivalent to the height ELGh of the resistance film 1020, the height ELGh of the resistance film 1020 is equivalent to the height MRh of the magnetoresistive film 83. This is used to convert the resistance value of the resistance film 1020 of the ELG elements 102a to the height MRh of the magnetoresistive film 83 of the magnetic heads 102.

Further, the magnetoresistive film 83 is formed on the wafer substrate through a shield layer. Conversely, the ELG elements 102a are not used as magnetic heads. Consequently, since a shield is not necessary, the ELG elements 102a are fabricated directly on the wafer substrate.

The following problems occurred with methods like this whereby ELG elements 102a are fabricated on row bar 101, and lapping is controlled by measuring the resistance of the ELG elements 102a.

Firstly, there were variations in accuracy when aligning masks to wafers. Consequently, the position P0 of the end of the magnetoresistive film 83 shown in FIG. 30A differs slightly from the position P1 of the end of the resistance film 1020. This is roughly a 0.1–0.2 micron difference, and for magnetic heads requiring micron order processing accuracy, this was not a problem.

However, when it comes to maintaining submicron processing accuracy, this difference poses a problem. With prior art, since the height of the ELG elements was treated as equivalent to the height of the magnetoresistive film, and the resistance values of the ELG elements were converted to the height of the magnetoresistive film, an accurate magnetoresistive film height could not be obtained. Consequently, the non-uniformity of the post-processing height of the magnetoresistive film was a problem.

Secondly, because the formation conditions for ELG elements are the same as those for magnetoresistive films, the same process used to fabricate magnetoresistive film was also used to fabricate ELG elements. However, since an ELG element is not fabricated through a shield layer, the distance from the pattern-generating stepper to the ELG element differs from the distance from the stepper to the magnetoresistive film. Consequently, the accuracy of ELG element pattern formation declines. This decline in accuracy increases the difference between the position P0 of the end of the magnetoresistive film 83 and the position P1 of the end of the resistance film 1020.

With prior art, since the height of the ELG elements was treated as equivalent to the height of the magnetoresistive film, and the resistance values of the ELG elements were converted to the height of the magnetoresistive film, an accurate magnetoresistive film height could not be obtained. Consequently, the non-uniformity of the post-processing height of the magnetoresistive film was a problem.

SUMMARY OF THE INVENTION

An object of the present invention is to provide a magnetic head manufacturing method for achieving magnetic head elements of uniform height via processing.

Another object of the present invention is to provide a magnetic head manufacturing method for obtaining accurate magnetic head element heights from ELG element resistance values.

Another object of the present invention is to provide a magnetic head manufacturing method for enhancing the alignment accuracy of the ELG elements and magnetic head elements.

FIGS. 1A and 1B are fundamental diagrams depicting the present invention.

The present invention comprises a step for forming on a wafer a plurality of magnetic head elements 102 and monitoring elements 102a incorporating analog resistance, by which resistance values change in analog fashion in line with the processing of the magnetic head elements 102; a step for cutting from the wafer a block 101 in which the plurality of magnetic head elements 102 and monitoring elements are lined up linearly; a step for processing the height of the magnetic head elements 102 to a prescribed height while measuring the resistance values of the monitoring elements 102a in the block 101; and a step for dividing the block 101 into individual magnetic heads 102 following processing.

Then, in one feature of the present invention, as shown in FIG. 1A, the formation step comprises a step for measuring the difference ΔI in the positions of the ends of the formed monitoring elements 102a and the ends of the formed magnetic head elements 102; and the processing step comprises a step for using the difference ΔI in positions to convert the resistance values of the monitoring elements 102a to the height of the magnetic head elements 102, and a step for terminating the processing when the height of the magnetic head elements 102 reaches a target value.

In this feature of the present invention, the difference ΔI between the positions of the ends of the monitoring elements 102a and the ends of the magnetic head elements 102 is measured, and the difference ΔI between these positions is incorporated into a relational expression that converts the resistance values of the monitoring elements 102a to the height of the magnetic head elements 102. Consequently, even though the resistance values of the ELG elements are converted to the height of the magnetoresistive film, an accurate magnetoresistive film height is obtained. This makes it possible to achieve precision uniformity of height of the magnetoresistive film following processing.

Further, in another feature of the present invention, as shown in FIG. 1B, the formation step comprises a process for fabricating a bottom shield layer 91 on the wafer substrate 100, a process for fabricating an insulation layer 92 on the bottom shield layer 91, and a process for fabricating the magnetoresistive film 83 of the magnetic head elements 102 and the monitoring elements 102a on the insulation layer 92.

In this feature of the present invention, because the monitoring elements 102a are also fabricated on the substrate 100 through the shield layer 91, the distance between the stepper and the monitoring elements 102a and the distance between the stepper and the magnetoresistive film 83 of the magnetic head elements 102 are equivalent. Consequently, the pattern formation accuracy is the same for both the monitoring elements 102a and the magnetic head elements 102.

This reduces the difference between the position P0 of the end of the magnetoresistive film 83 and the position P1 of the end of the resistance film 1020. Therefore, even though the resistance values of the ELG elements are converted to the height of the magnetoresistive film, an accurate magnetoresistive film height is obtained. Consequently, it is possible to achieve precision uniformity of height of the magnetoresistive film following processing.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below serve to explain the principle of the invention, in which:

FIG. 5 is a schematic diagram depicting the ELG element depicted in FIG. 2.

DESCRIPTION OF THE PREFERRED EMBODIMENTS

Figure 1A:
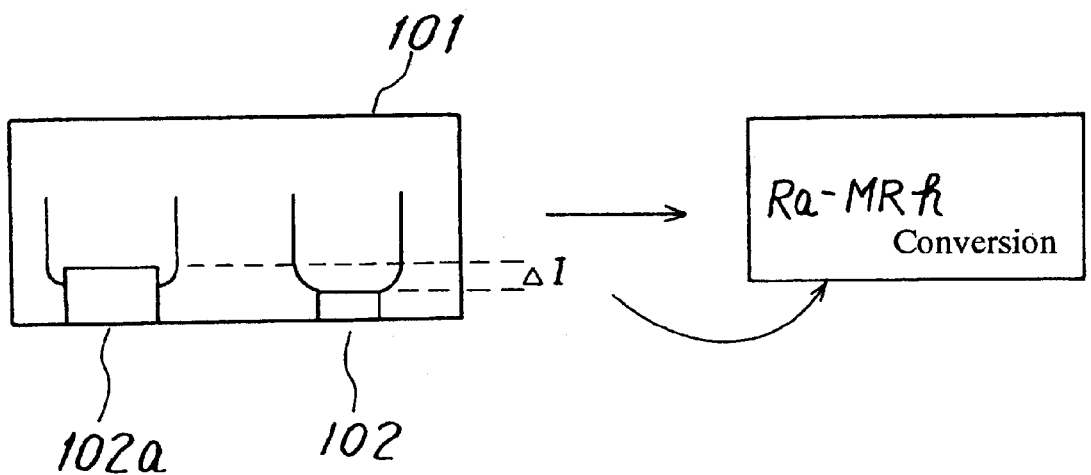
FIGS. 1A and 1B provides fundamental diagrams depicting the present invention.
Figure 1B:
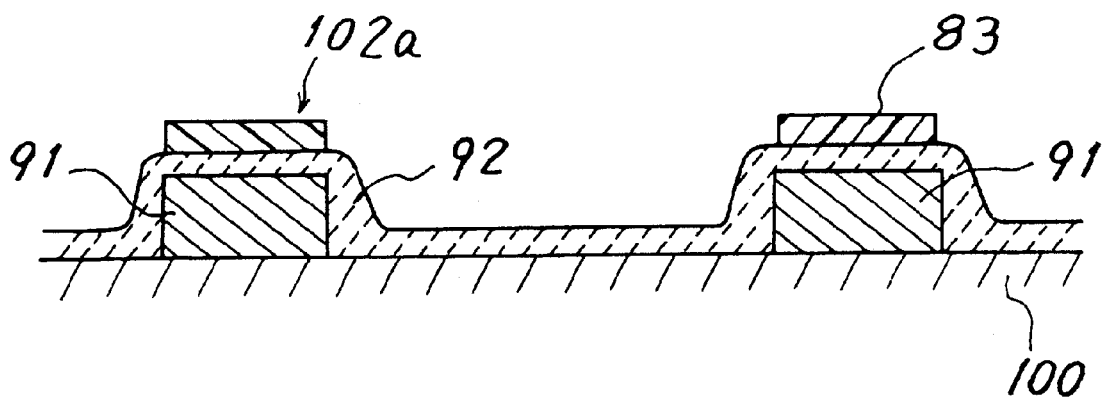
Figure 2:
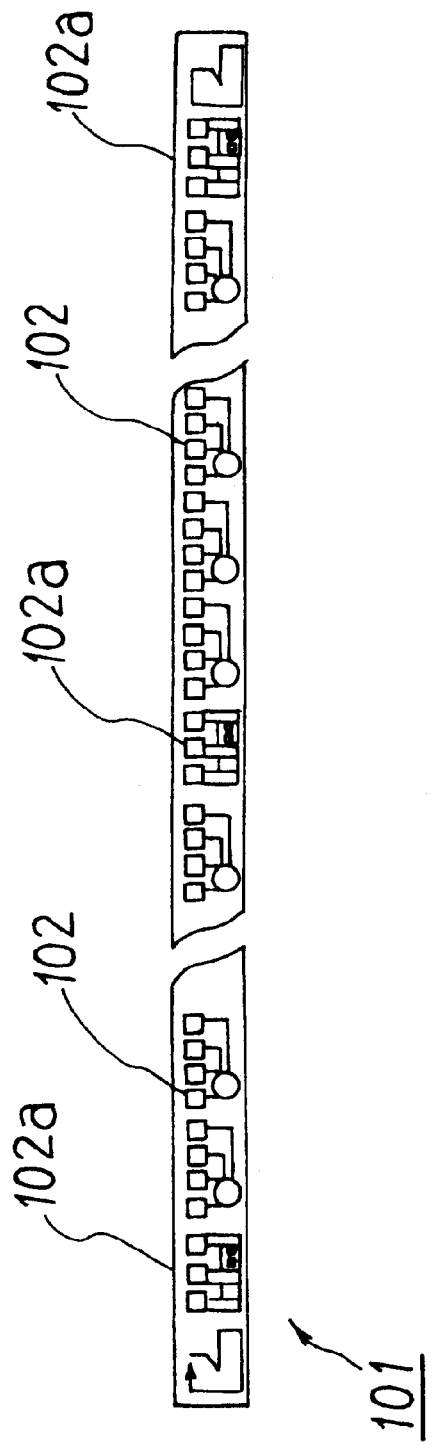
FIG. 2 is a schematic diagram depicting a row bar of an embodiment of the present invention.
Figure 3:
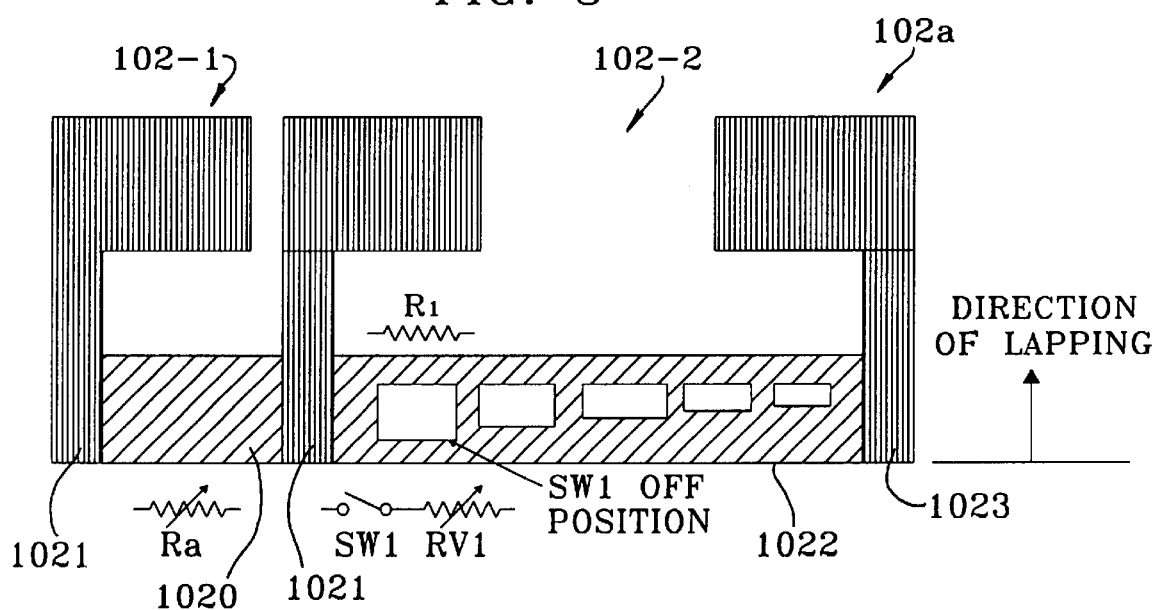
FIG. 3 is a block diagram depicting the ELG element depicted in FIG. 2.
Figure 4A:
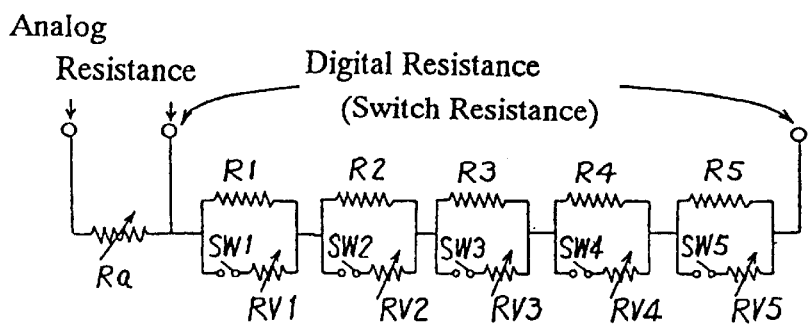
FIGS. 4A and 4B provide diagrams depicting the characteristics of the ELG element depicted in FIG. 2.
Figure 4B:
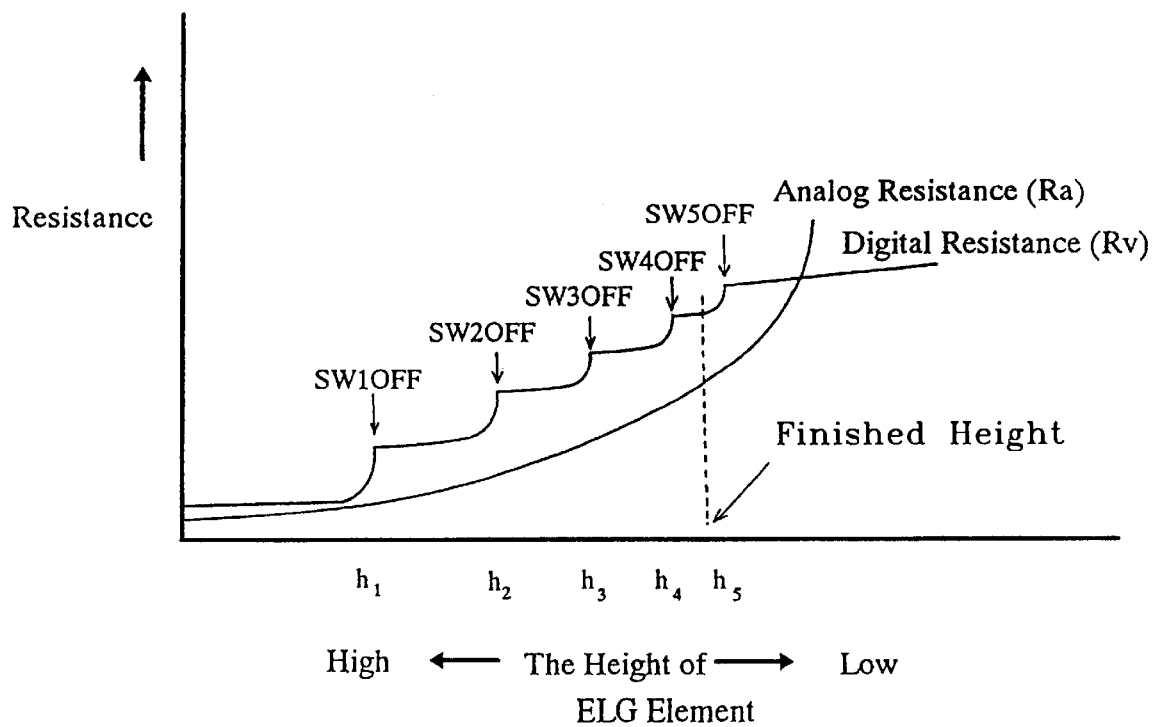

FIG. 2 is a schematic diagram of the row bars (blocks) of an embodiment of the present invention, FIG. 3 is a block diagram of the ELG elements depicted in FIG. 2, FIGS. 4A and 4B provide diagrams depicting the characteristics of the ELG elements shown in FIG. 2, and FIG. 5 is a schematic diagram of the ELG elements depicted in FIG. 2.

As shown in FIG. 2, a row bar 101 comprises magnetic heads 102 and ELG elements 102a. The ELG elements 102a are fabricated in three places, the left end, center and right end of the row bar 101.

As shown in FIG. 3, an ELG element 102a comprises analog resistance 102-1 and digital resistance 102-2. Analog resistance 102-1 comprises a pattern by which the resistance value rises in accordance with the reduction of the resistance film. Digital resistance 102-2 comprises a pattern by which it shuts OFF when the resistance film is reduced to a fixed value. Digital resistance 102-2 comprises five switches. As shown in FIG. 5, the OFF position for each of the switches is h1, h2, h3, h4 and h5.

Therefore, as an equivalent circuit, as shown in FIG. 4A, analog resistance 102-1 is exhibited as variable resistance. Then, as shown in FIG. 4B, the resistance value rises in line with the decrease in the height of the ELG element. As for digital resistance 102-2, as an equivalent circuit, this resistance is exhibited as the resistance of five switches as shown in FIG. 4A. Then, as shown in FIG. 4B, the resistance values change to bent line shapes in the resistance OFF positions.

The resistance value of an ELG element 102a indicates the height ELGh of the ELG element 102a. The height relationship between the analog resistance value Ra of this ELG element and the ELG element height ELGh can be approximated by Equation (1) shown below.

$$Ra = a/ELGh + b \quad (1)$$

The coefficients a, b in Equation (1) can be determined in advance by experimentation.

Here, the ELG element 102a is fabricated using the same material as that used for the magnetoresistive film 83. However, errors in mask precision, as shown in FIG. 5, result in a deviation in the position P0 of the end of the magnetoresistive film 83 of the magnetic head 102 and the position P1 of the end of the ELG element 102a. Consequently, the height ELGh of the ELG element 102a differs from the height MRh of the magnetoresistive film 83 of the magnetic head 102.

This difference ΔI is measured in advance. The relationship between the height ELGh of the ELG element 102a and the height MRh of the magnetoresistive film 83 can be expressed by Equation (2) shown below.

$$ELGh = MRh + \Delta I \quad (2)$$

Therefore, the height MRh can be obtained from the following equation.

$$MRh = a/(Ra-b) - \Delta I \quad (3)$$

This difference ΔI varies for each row bar. To measure this difference ΔI for each row bar 101 would be an extremely difficult task. Therefore, this difference ΔI is measured by sampling row bars 101 on a wafer 100. For the row bars 101 not included in the sampling, the difference ΔI is approximated using the measured difference ΔI.

Returning to FIG. 3, the characteristics of Equation (1) described above change according to the processing conditions for each wafer 100. Digital resistance 102-2 is fabricated to compensate for this. The OFF positions h1–h5 for digital resistance 102-2 are known in advance. Digital resistance 102-2 OFF is. detected, and the measured resistance value RA of analog resistance and the OFF positions at that time are entered into Equation (1). The coefficients a,b of Equation (1) are obtained when digital resistance is detected as being OFF at two points.

Equation (3) converts the analog resistance value Ra of the ELG element to the height MRh of the magnetoresistive film 83. This makes it possible to obtain the height of the magnetoresistive film 83 by measuring the resistance value of the ELG element. Therefore, it is possible to judge whether or not the height of the magnetoresistive film has reached the target value. As is explained below, processing is terminated when the height of the magnetoresistive film reaches the target value.

In this way, when the difference ΔI is measured beforehand, and the resistance value is converted to the height, the resistance value inclusive of the measured difference ΔI is converted to the height. Consequently, even if a difference in position is generated between an ELG element 102a and a magnetoresistive element 83 due to an error in mask precision, this makes it possible to compensate for that difference.

Figure 6:
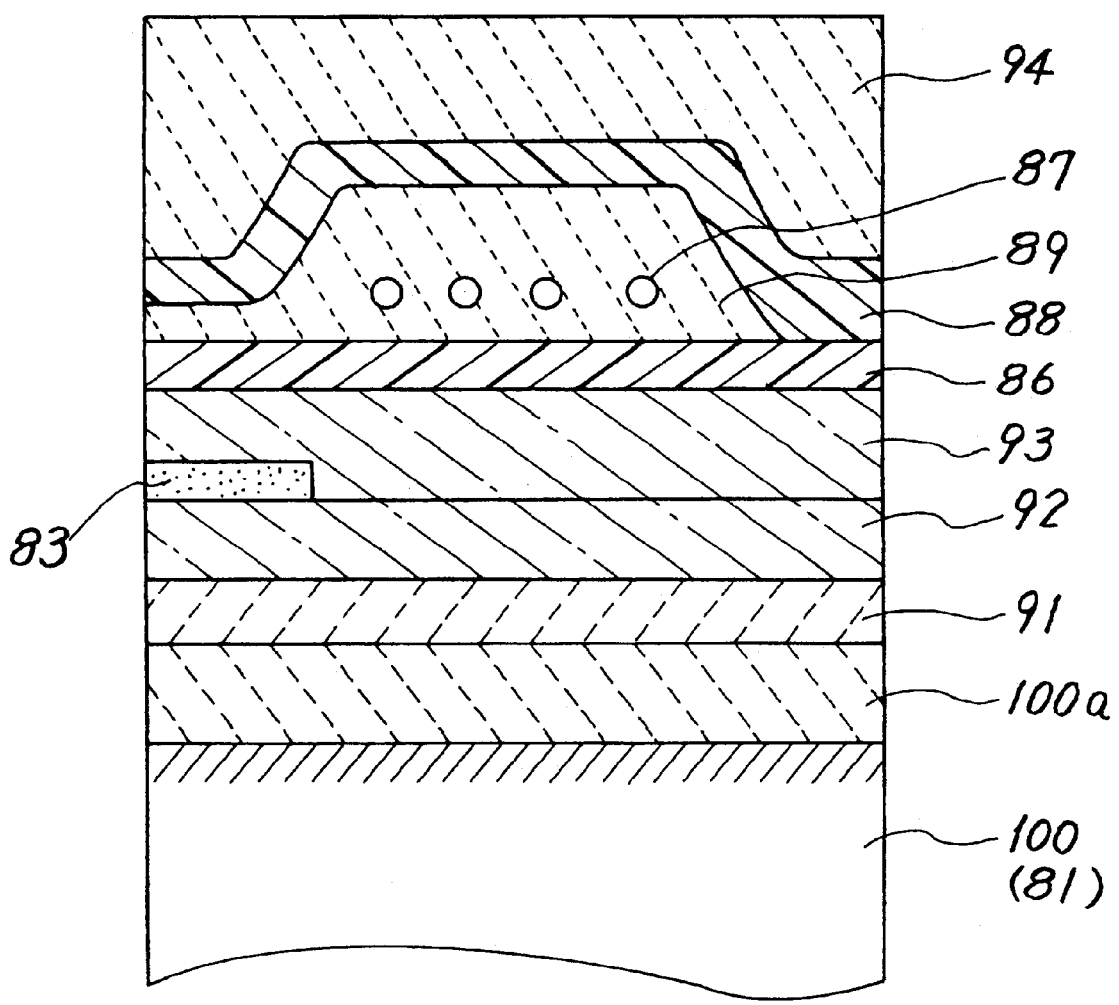
FIG. 6 is a cross-sectional view of the row bar depicted in FIG. 2.
Figure 7:
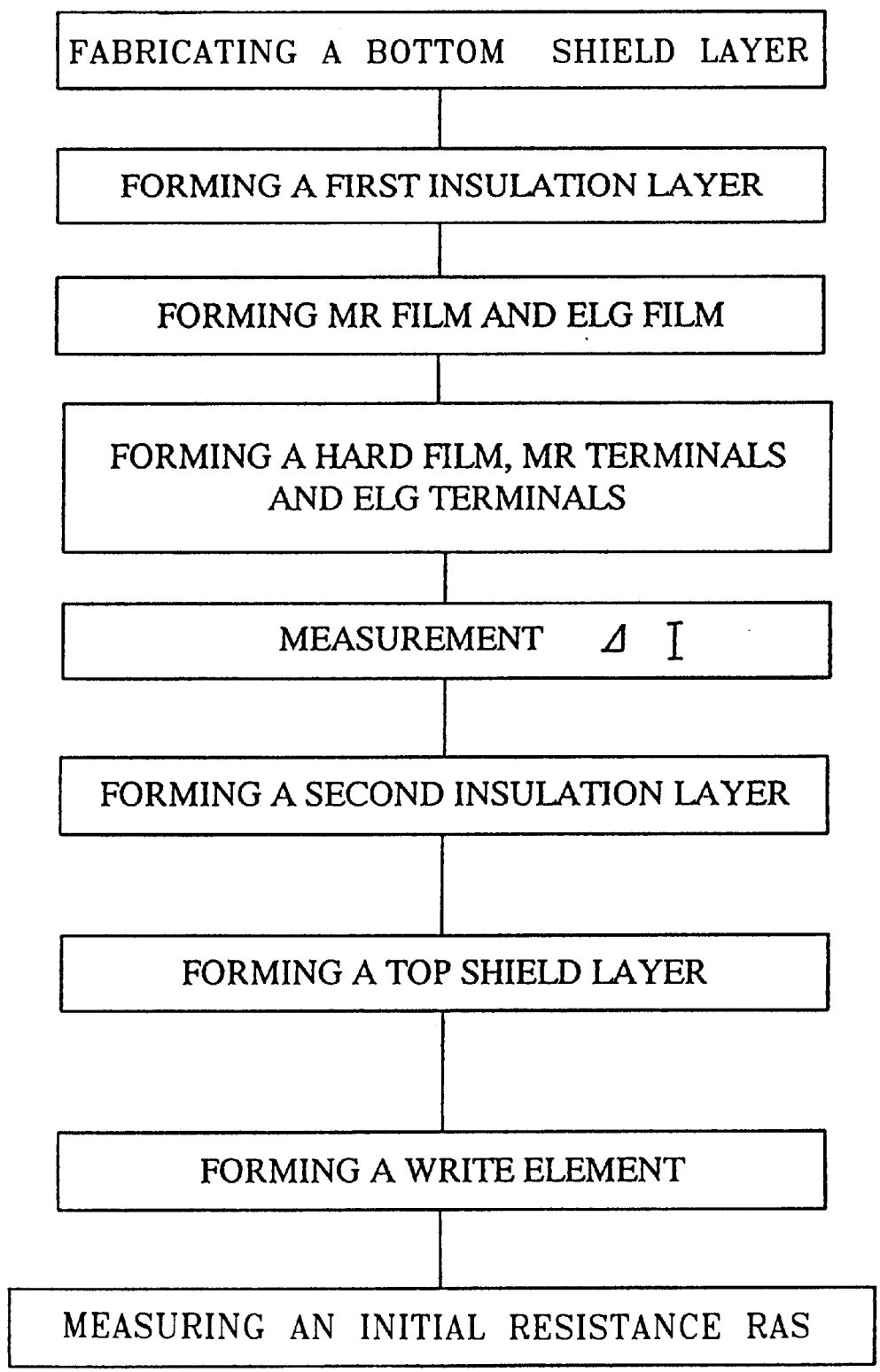
FIG. 7 is a chart describing the process used in the formation of the row bar depicted in FIG. 6.
Figure 8:
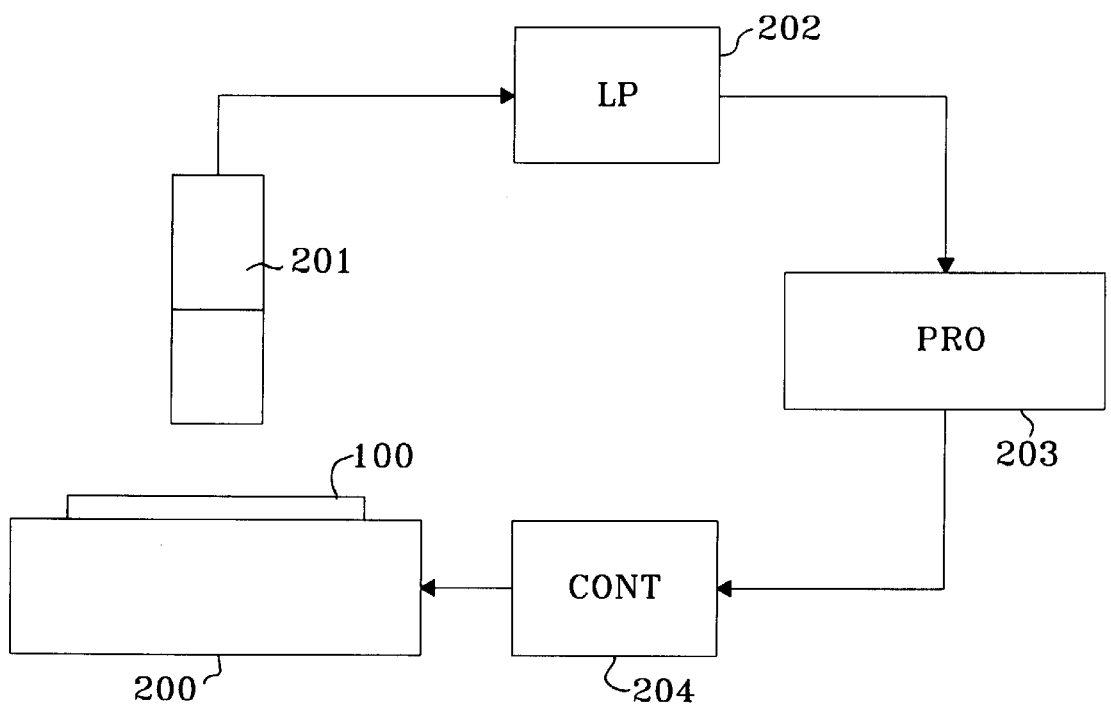
FIG. 8 is a schematic diagram depicting the operation used to measure the pattern dimensions listed in FIG. 7.
Figure 9:
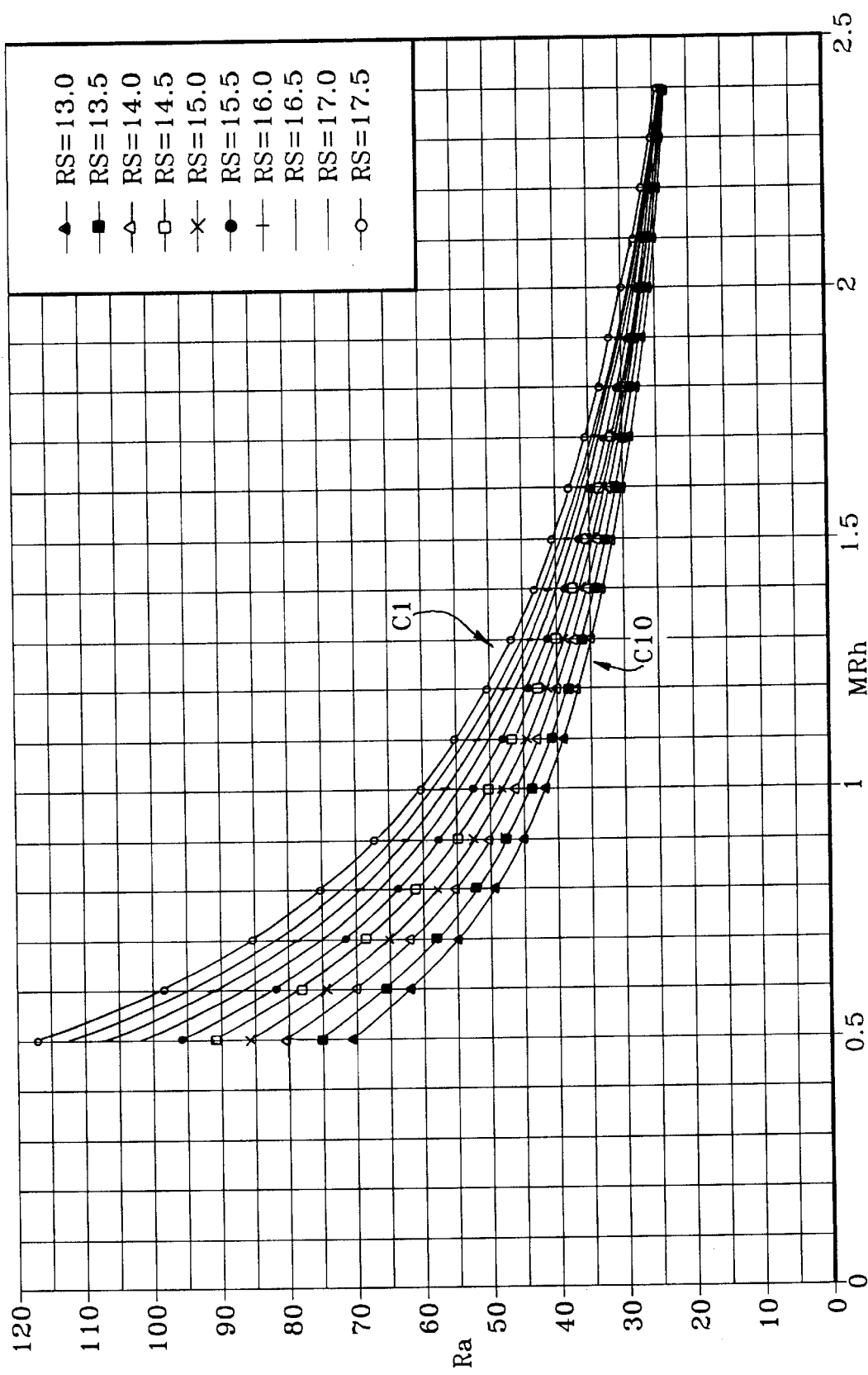
FIG. 9 graphs the characteristics of the initial resistance listed in FIG. 7.

Next, FIGS. 6 through 9 are used to explain difference ΔI measurement. FIG. 6 provides a cross-section view of the row bar depicted in FIG. 2, FIG. 7 lists the processes used in the formation of a row bar, FIG. 8 is a schematic diagram depicting the pattern dimension measurement operation explained in FIG. 7, and FIG. 9 provides a graph depicting initial resistance.

The formation process listed in FIG. 7 is explained with reference to FIG. 6.

First, a bottom shield layer 91 that shields the magnetoresistive element 83 is formed on top of an insulation layer 100a on a wafer substrate 100 (81).

A first insulation layer 92 is formed on top of this bottom shield layer 91. Next, a magnetoresistive film (MR film) 83 and ELG element 102a resistance film (ELG film) 1020 are formed on top of the first insulation layer 92.

Then, a hard film and terminals 84 are formed on the magnetoresistive film 83. The terminals 1021 of the ELG element 102a are formed at this time.

After that, the wafer 100 is taken off and the difference ΔI is measured using the mechanism depicted in FIG. 8. The difference ΔI is measured here prior to forming the write element. The reason for this is because the magnetoresistive film 83 and ELG element 102a are covered by the write element when it is formed. Once covered by the write element, these films are no longer visible, making it impossible to optically detect their difference.

Next, a second insulation layer 93 is formed. On top of this, a top shield layer 86 is formed to shield the top of the magnetoresistive element 83. This top shield layer 86 also serves as the bottom magnetic pole of the write element.

Then, the write element is formed. That is, a nonmagnetic insulation layer 89, a coil 87 and a top magnetic pole 88 are formed. An insulation layer 94 is formed on top of this for protection. The initial analog resistance value Ras of the ELG element 102a is then measured. Using this initial resistance value, the coefficients a,b of relational expression (1) described earlier are determined as described below with reference to FIG. 10.

The operation used to measure the difference ΔI is depicted in FIG. 8. The wafer 100 on which the magnetoresistive elements and ELG elements are fabricated is mounted onto a precision stage 200. The positioning of the precision stage 200 is controlled by a stage controller 204. A charge-coupled device (CCD) camera 201 photographs the wafer 100. The image data from the CCD camera 201 is subjected to image processing by an image processor 202. The results of image processing are processed by a personal computer-based processor 203. The processor 203 sends instructions to the stage controller 204.

As shown in FIG. 5, this system controls the precision stage 200 and photographs the image of the ELG element 102a using a CCD camera 201. Then, the position P1 of the end of the ELG element 102a is detected via the image processor 202. Next, by controlling the precision stage 200, an image of the magnetoresistive film 83 is photographed using the CCD camera 201. Then, the position P0 of the end of the magnetoresistive film 83 is detected via the image processor 202.

The processor 203 computes the difference ΔI between the positions P0 and P1 which the image processor 202 detected. This data, as explained earlier, is applied to a sampling of row bars 101. The processor 203 uses this data to create the difference ΔI for the other row bars 101.

FIG. 9 is used to explain the initial resistance value described earlier. The relationship between the analog resistance value Ra and the height MRh of the magnetoresistive element 83 changes in accordance with the initial resistance value Ras. As shown in FIG. 9, the characteristics of the initial resistance value Ras at 13 ohms are indicated by C1 in the diagram. Conversely, at 17.5 ohms, the characteristics of the initial resistance value Ras are indicated in the diagram by C2.

The following Equation (4) expresses this relationship.

$$Ra = (k1 \cdot Ras - k2)/ELGh - k3 \cdot Ras + k4 \quad (4)$$

$$ELGh = MRh + \Delta I$$

Provided that k1, k2, k3 and k4 are coefficients.

Consequently, the relationship between the resistance value Ra and the height MRh of the magnetoresistive element 83 in each of the initial resistance values graphed in FIG. 9 is measured beforehand by experimentation. Then, a relational expression shown in FIG. 9 is selected in accordance with the measured initial resistance value Ras. That is, the coefficients a,b of relational expression (1) are determined by the initial resistance value Ras.

When done this way, the changing characteristics can be readily determined in accordance with the initial resistance value Ras. Consequently, the resistance value Ra can be accurately converted to the height MRh of the magnetoresistive element 83.

Figure 10:
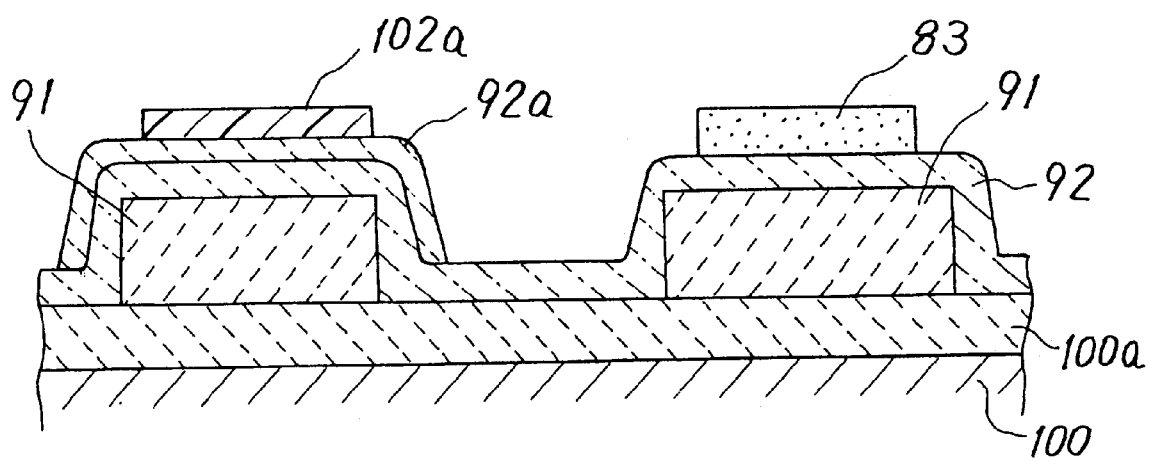
FIG. 10 provides a cross-sectional view of the ELG element depicted in FIG. 6.

FIG. 10 provides a cross-section view of the ELG element shown in FIG. 6. As explained in FIG. 7 as well, a bottom shield layer 91 is formed on top of an insulation layer 100a on a wafer substrate 100. A bottom shield layer 91 is required to shield the magnetoresistive film 83. Consequently, this shield was only formed beneath the magnetoresistive film 83 in the prior art.

However, when a bottom shield 91 is not formed beneath the ELG element 102a, the distance between the stepper and ELG element 102a differs from the distance between the stepper and the magnetoresistive film 83. Consequently, the pattern formation accuracy of the ELG element 102a and magnetic head element 102 differed. This lowered the pattern formation accuracy of the ELG element 102a.

To prevent this, a bottom shield layer 91 is formed beneath the ELG element 102a as well.

This makes the distance from the stepper to the ELG element 102a the same as the distance from the stepper to the magnetoresistive film 83. Consequently, the difference between the position P0 of the end of the magnetoresistive film 83 and the position P1 of the end of the resistance film 1020 is lessened. Therefore, an accurate magnetoresistive film height can be achieved even when the resistance value of the ELG element is converted to the height of the magnetoresistive film. Consequently, it is possible to make the post-processing height of the magnetoresistive film exactly uniform.

Further, as shown in FIG. 10, there is an auxiliary insulation layer 92a beneath the ELG element 102a. The reason for this can be explained as follows. The ELG element 102a comes in contact with the lapping table during lapping. The contact status at this time, and the resistance of the slurry (abrasive) during lapping causes the measuring current applied to the ELG element 102a to flow into the bottom shield layer 91, resulting in a short.

To prevent this from happening, the gap between the ELG element 102a and the bottom shield layer 91 must be enlarged. However, the gap between the magnetoresistive film 83 and the bottom shield layer 91 is determined by the thickness of the first insulation layer 92. This gap affects the characteristics of the magnetoresistive film 83. Therefore, the thickness of the first insulation layer 92 cannot be increased.

Because the ELG element 102a is not used as a magnetic head, the gap between the ELG element 102a and the bottom shield layer 91 can be enlarged. Consequently, an auxiliary insulation layer 92a is formed beneath the ELG element 102a.

This approach enables the gap between the ELG element 102a and the bottom shield layer 91 to be enlarged without affecting the characteristics of the magnetoresistive film 83. This makes it possible to prevent the ELG element 102a short.

Furthermore, as shown in FIG. 5, the surface area of the resistance film 1020 of the ELG element 102a is larger than the surface area of the magnetoresistive film 83. The length of the core of the magnetoresistive film 83 is determined by the width of the tracks on a magnetic disk. For example, this might be around 20 microns. Further, the height is around 2 microns. If the surface area of the resistance film 1020 of the ELG element 102a is made equivalent to the surface area of this magnetoresistive film 83, this would lessen the change in the resistance value of the ELG element.

Thus, the change in the resistance value of the ELG element is increased by making the surface area of the resistance film 1020 of the ELG element 102a larger than the surface area of the magnetoresistive film 83. For example, the core length is set at 50 microns.

Figure 11A:
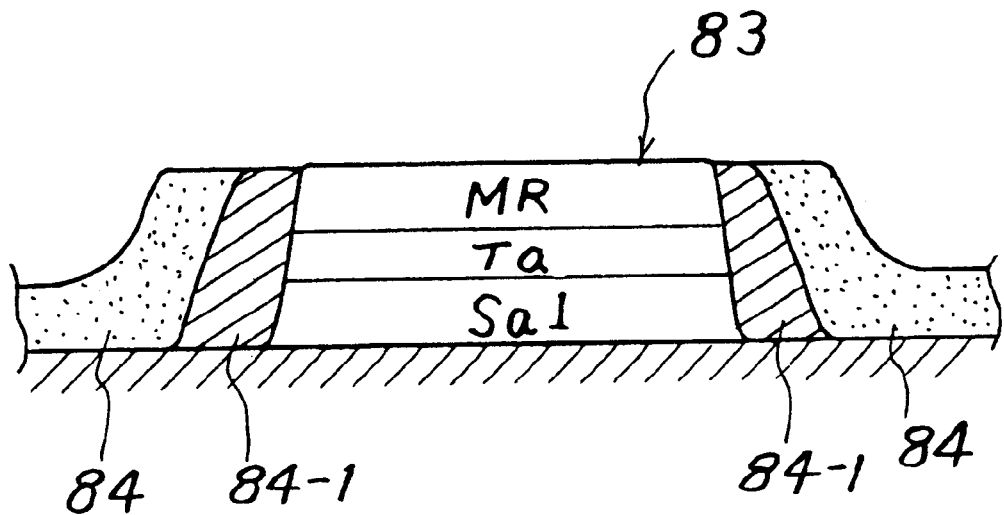
FIGS. 11A and 11B provide block diagrams of the terminals of the ELG element depicted in FIG. 6.
Figure 11B:
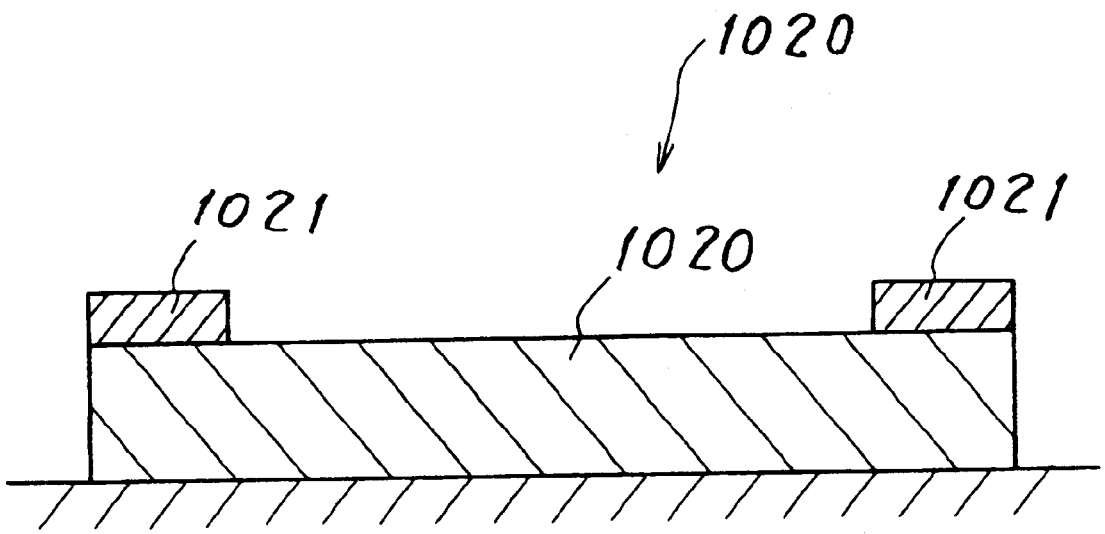

FIGS. 11A and 11B are schematic diagrams depicting the terminals of the ELG element depicted in FIGS. 6 and 7. As shown in FIG. 11A, the magnetoresistive film 83 comprises an MR layer (Fe-Ni), a Ta layer and a SAL layer. To control the magnetic domain of this magnetoresistive film 83, hard film 84-1 is formed on the sides. The hard film 84-1 comprises a ferromagnetic material. In the diagram, the hard film 84-1 controls the magnetic domain of the magnetoresistive film 83 in the transverse direction. Furthermore, terminals 84 are formed on the sides of this hard film 84-1.

Conversely, as shown in FIG. 11B, terminals 1021 are formed on top of the resistance film 1020 of the ELG element 102a. The reason for this can be explained as follows. With the magnetoresistive film 83, terminals 84 must be formed on the sides of the film to control the magnetic domain of the magnetoresistive film. However, this type of contact results in greater contact resistance.

With an ELG element 102a, there is no need to control the magnetic domain. Therefore, forming a lead terminal 1021 on top of the resistance film 1020 of the ELG element 102a reduces the contact surface, thus lessening contact resistance. When this approach is used, measurement sensitivity can be improved to the extent contact resistance is diminished.

Next, the lapping process is explained.

Figure 12:
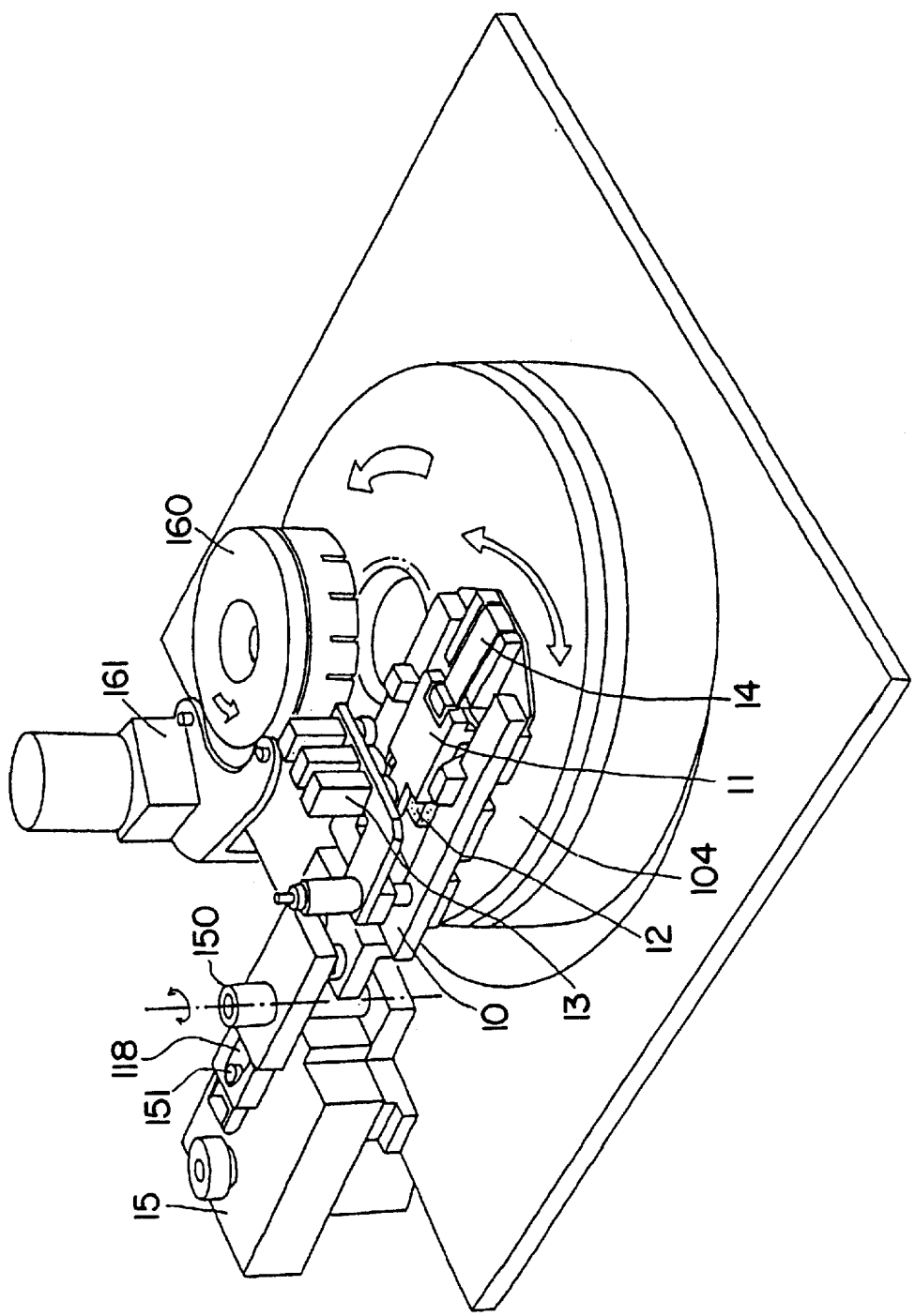
FIG. 12 provides a strabismic view of a lapping machine used in an embodiment of the present invention.
Figure 13:
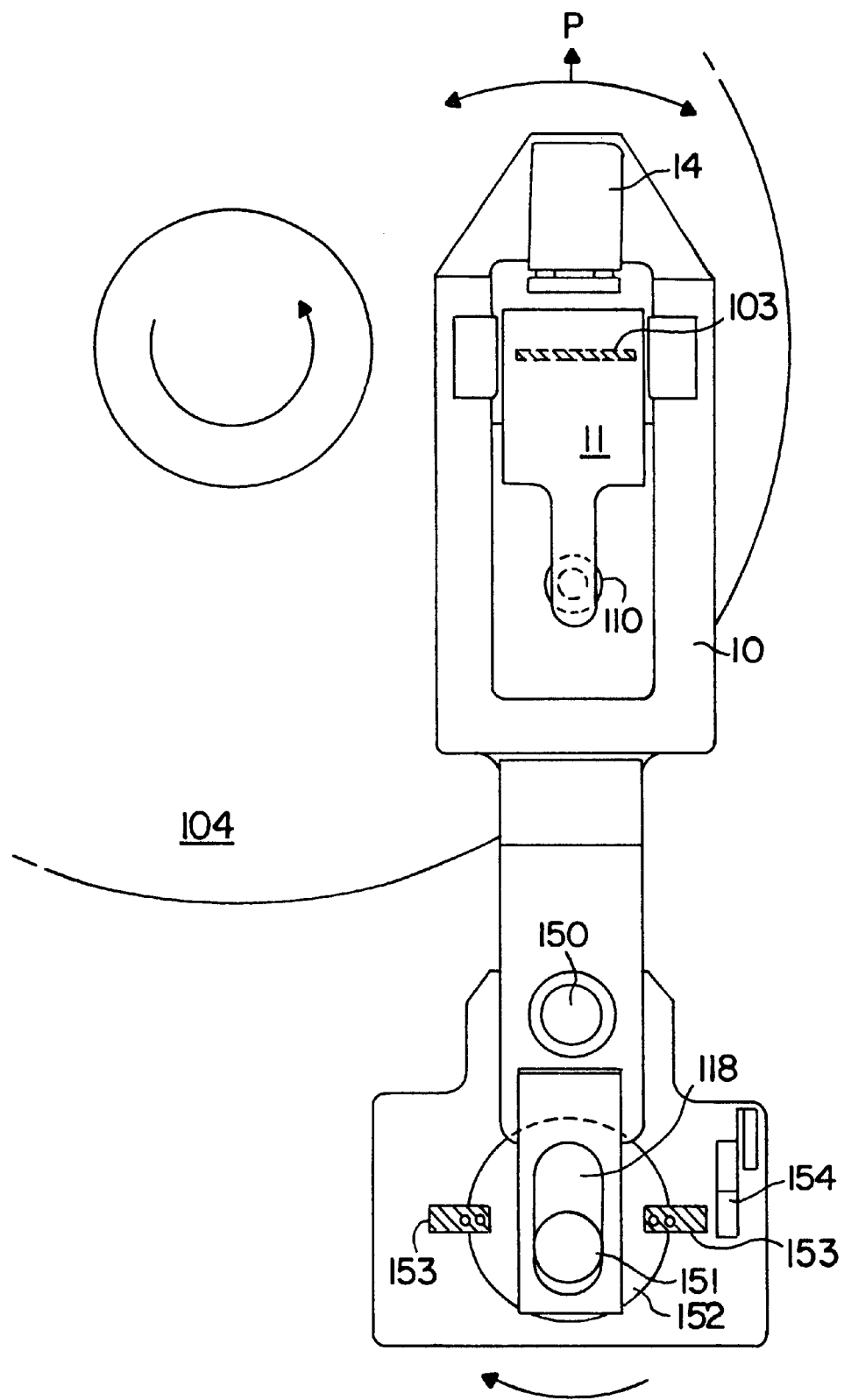
FIG. 13 presents a top view of the lapping machine depicted in FIG. 12.
Figure 14:
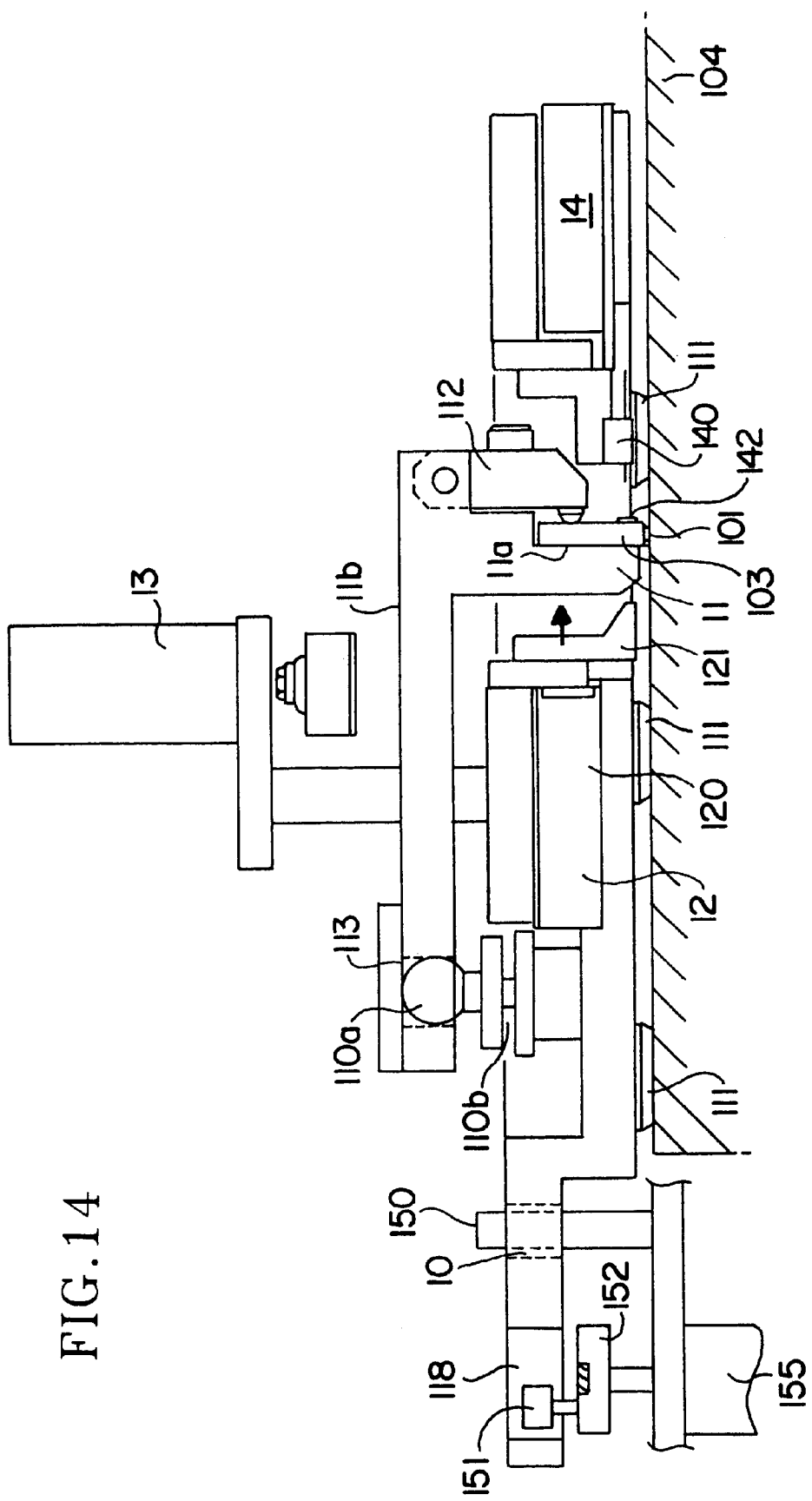
FIG. 14 provides a side view of the lapping machine depicted in FIG. 12.
Figure 15:
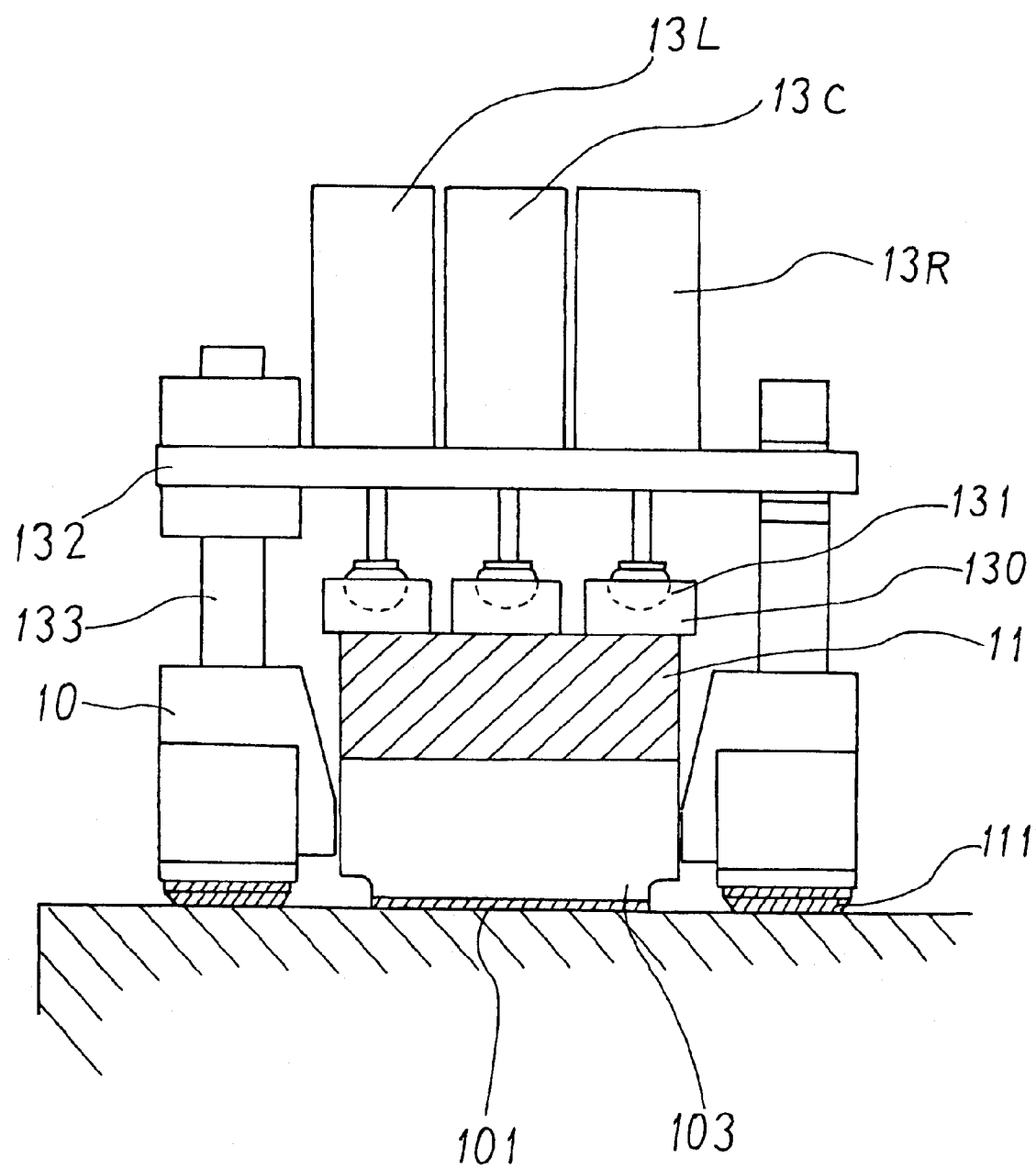
FIG. 15 depicts a cross-sectional view of the lapping machine depicted in FIG. 12.

FIG. 12 provides a strabismic view of a lapping machine used in an embodiment of the present invention, FIG. 13 presents a top view of a lapping machine used in an embodiment of the present invention, FIG. 14 provides a side view of the lapping machine shown in FIG. 12, FIG. 15 provides a cross-sectional view of the lap mechanism depicted in FIG. 12, and FIG. 16 is a schematic diagram of the work depicted in FIG. 12.

As depicted in FIGS. 12, 13 and 14, a lap table 104 is rotated by a motor, not diagrammed in the figures. The lap base 10 has six bearing surfaces 111 on its under side. The lap base 10 is set on an axis of rotation 150, which is affixed to the machine, and can be rotated around the axis of rotation 150. A cam hole 118 is located at the other end of the lap base 10.

A swing mechanism 15 swings the lapping table base 10 from side to side. The swing mechanism 15, as shown in FIGS. 13 and 14, comprises a swing motor 155, a cam pulley 152, which is rotated by the swing motor 155, and a swing cam 151 mounted to the cam pulley 152. The swing cam 151 engages the cam hole 118 in the lap base 10.

Therefore, as shown in FIG. 13, the rotation of the swing motor 155 swings the lap base 10 from side to side in the directions indicated by the arrows depicted in the figure. The cam pulley 152 is equipped with two sensor-driven actuators 153. A sensor 154 detects the sensor-driven actuators 153. The positions of the sensor-driven actuators 153 are set so that they can be detected by the sensor 154 when the lap base 10 is located at the point P (center point of swing) indicated in FIG. 13.

Returning to FIG. 12, the lap base 10 is equipped with a pressure mechanism 13 described below. The pressure mechanism 13 applies pressure to an adapter 11. The adapter 11 is set on the lap base 10. The adapter 11, as shown in FIG. 14, is shaped almost like an L. Work 103 (101) is set on the first surface 11a of this adapter. The work 103 is affixed to the first surface 11a by a work-fixing jig 112.

The adapter 11 has a second surface 11b. The end of the second surface 11b is equipped with a brace 113. A support mechanism 110 built into the lap base 10 comprises a spherical supporter 110a and a height adjustment screw 110b. The brace 113 on the adapter 11 engages this supporter 110a.

Therefore, the adapter is supported at a point on the lap base 10, and the lap table 104 makes contact with the processing surface of the work 103. That is, the adapter 11 is supported at three points, comprising two points on the work 103 and one point on the support mechanism 110. Consequently, the work 103 can rotate around the support mechanism 110. This enables the work 103 to emulate the lap 104 independent of the lap base 10.

Consequently, the work 103 is processed by the lap table 104 irrespective of the precision of the lap base 10. This makes it possible to process the work uniformly.

Returning to FIG. 12, an unloading mechanism 12 is mounted to the lap base 10. The unloading mechanism 12, as shown in FIG. 14, pushes against the adapter 11. This causes the adapter 11 to rotate around the supporter 110a, and to evacuate the work 103 from the lapping table 104. This unloading mechanism 12 comprises an unloading cylinder 120 and an unloading block 121.

This unloading operation can be explained as follows. When the height MRh of the magnetoresistive film 83 on the row bar 101 attains the prescribed value, processing must be terminated. Terminating lapping is done by stopping the lap. However, the lap table decelerates to a stop after receiving instructions to stop. Consequently, the work 103 continues to undergo lapping until the lap stops, giving rise to non-uniform precision of work dimensions.

Consequently, when the height MRh of the magnetoresistive film 83 attains the prescribed value, the unloading cylinder 120 operates, pushing out the unloading block 121. This rotates the adapter 11 around the supporter 110a and disengages the work 103 from the lap table 104. As a result, lapping is terminated as soon as the height MRh of the magnetoresistive film 83 attains the prescribed value. Consequently, the precision of the work dimensions is improved. Also, the existence of an adapter 11 facilitates unloading.

Further, as shown in FIG. 13, unloading is performed when the sensor 154 detects the actuators 153, thus detecting the fact that the lap base 10 is located at point P (the center point of the swing). The reason for this is that if the stopping position of the swing mechanism is random, then lap marks are left on the work at the stopping location.

The swing rate slows at both ends of the swing, making the work susceptible to lap marks. Conversely, the swing rate is the fastest at the center of the swing P, making it difficult for lap marks to be left on the work. The sensor 154 detects the actuators 153 there, thus detecting the fact that the lap base 10 has reached the center point P of its swing, and the above-described unloading of the work is performed. This makes it possible to prevent lap marks from adhering to the work at termination of lapping.

A probe mechanism 14 is mounted to the tip of the lap base 10. The probe mechanism 14, as shown in FIG. 14, makes electrical contact with the ELG elements of the row bar 101 affixed to the work 103. The probe mechanism 14 is equipped with a probe 140 that makes electrical contact with these ELG elements.

Returning to FIG. 12, a correction ring 160 is rotated by a correction ring rotation mechanism 161. The correction ring 160 spreads out the slurry (abrasive) evenly and embeds the slurry into the lap table 104. This rectifies the flatness of the lap table 104.

As shown in the cross-section view depicted in FIG. 15, the pressure mechanism 13 comprises three pressure cylinders 13L, 13C, 13R. The pressure cylinders 13L, 13C, 13R are supported by a support plate 132. The support plate 132 can rotate on an axis of rotation 133. Therefore, when setting the adapter 11 on the lap base 10, the support plate 132 can be rotated to expose the lap base 10, and allow the adapter 11 to be set on the lap base 10.

The left pressure cylinder 13L applies pressure to the left side of the adapter 11. The center pressure cylinder 13C applies pressure to the center of the adapter 11. The right pressure cylinder 13R applies pressure to the right side of the adapter 11. Pressure blocks 130 are affixed to the tips of each pressure cylinder 13L, 13C, 13R. The pressure blocks 130 are supported by a spherical part 131. Therefore, the pressure cylinders can apply pressure uniformly to the adapter 11.

Figure 16A:
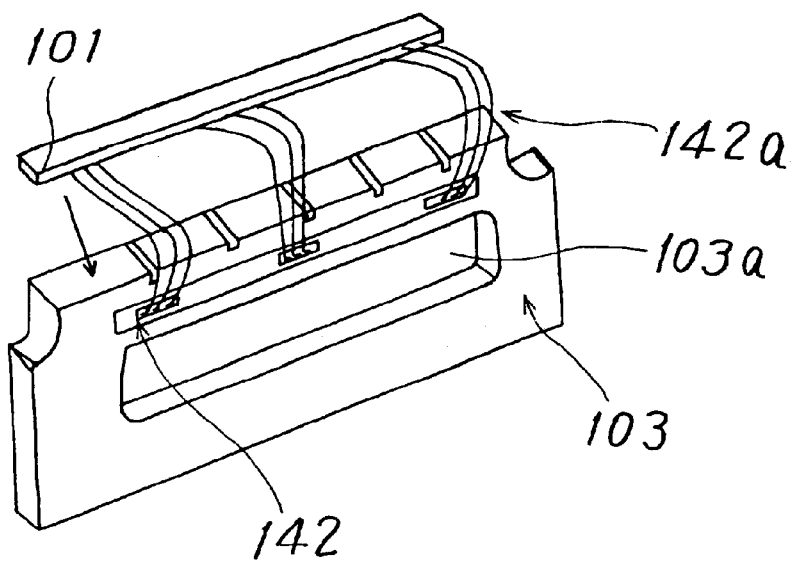
FIGS. 16A and 16B provide schematic diagrams depicting the work depicted in FIG. 12.

As shown in FIG. 16A, the work (mounting jig) 103 has a mounting hole 103*a*. A row bar 101 is bonded to the work 103. The work 103 is equipped with a printed-circuit 142. The printed-circuit 142 has large terminals. And the terminals of the ELG elements 102*a* of the row bar 101 are connected to the terminals of the printed-circuit 142 by wire bonding wires 142*a*.

The terminals of the ELG elements 102*a* of the row bar 101 are small. Thus, when they are covered by an abrasive, stable resistance measurement is not possible even when the probe 140 is brought directly in contact with the terminals. Consequently, the lapping machine is designed so that the probe 140 comes in contact with the printed-circuit 142. The printed-circuit 142 can be mounted in a location separate from the lapping surface, and can be equipped with large terminals, thus making possible stable resistance measurement.

Figure 16B:
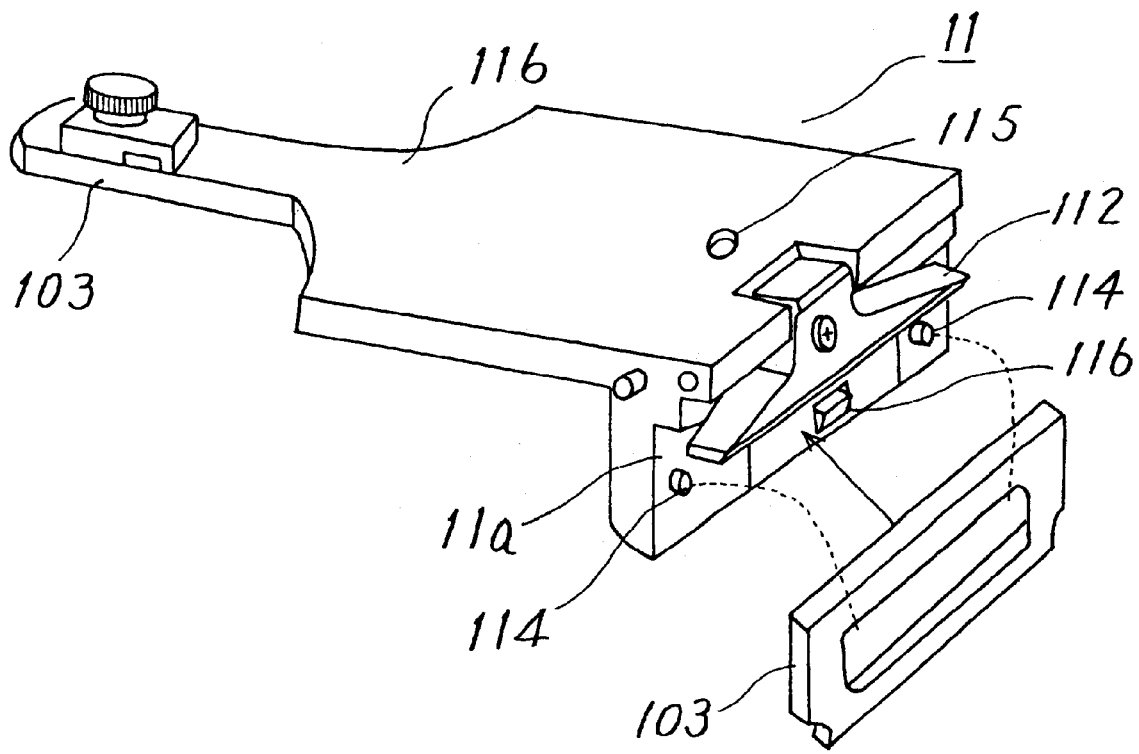

As shown in FIG. 16B, the work 103 is mounted to the adapter 11. The adapter 11 comprises protrusions 114 that engage the holes 103*a* in the work 103 and support the work 103, and a work-fixing block 112. The work 103 is positioned using the protrusions 114, and is clamped and held to the first surface 11*a* by the fixing block 112. Further, 115 and 116 are parts of a bending mechanism described later with reference to FIG. 18.

Figure 17:
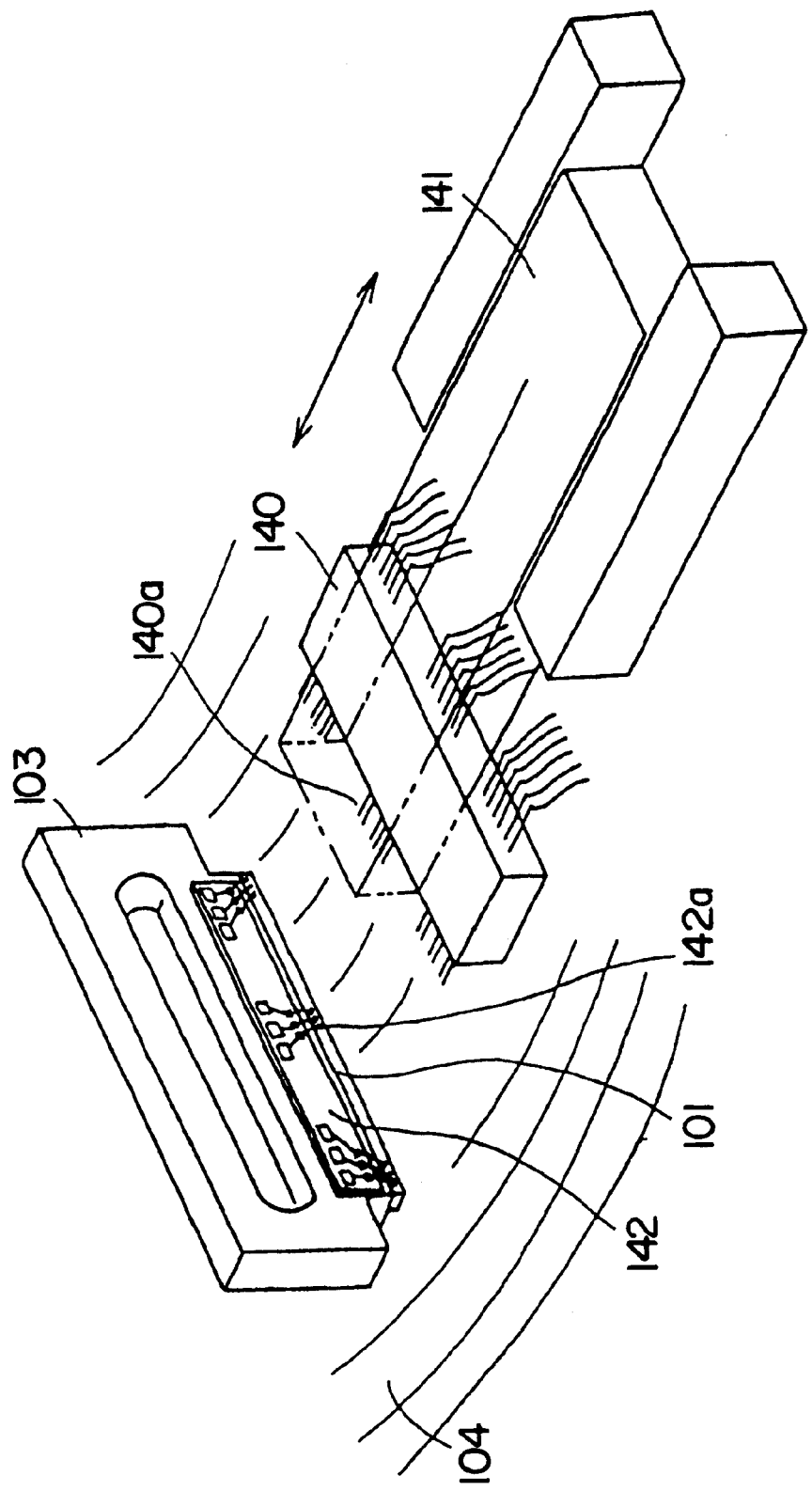
FIG. 17 is a schematic diagram depicting the probe mechanism depicted in FIG. 12.

FIG. 17 is a schematic diagram of the probe mechanism depicted in FIG. 12.

As shown in FIG. 17, the probe block 140 supports a plurality of probes 140*a*. The probe block 140 is moved by the probe cylinder 141. The probe cylinder 141 causes the probes 140*a* to make contact with the printed-circuit 142 during resistance measurement. Meanwhile, when the adapter 11 is set on the lap base 10, the probe cylinder 141 evacuates the probes 140*a* to facilitate the setting up of the adapter 11.

Figure 18:
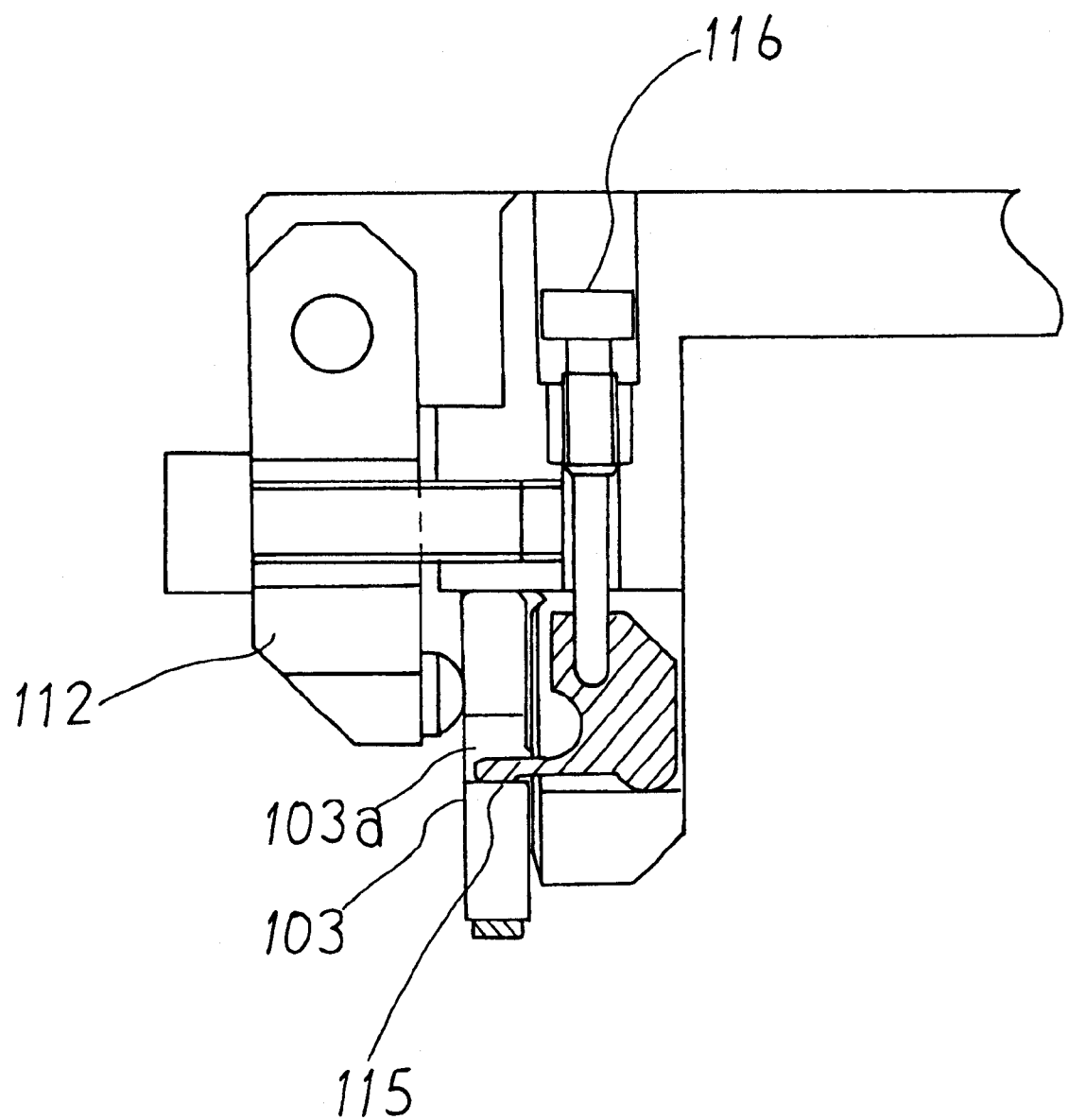
FIG. 18 provides a cross-sectional view of the bending mechanism depicted in FIG. 16.
Figure 19:
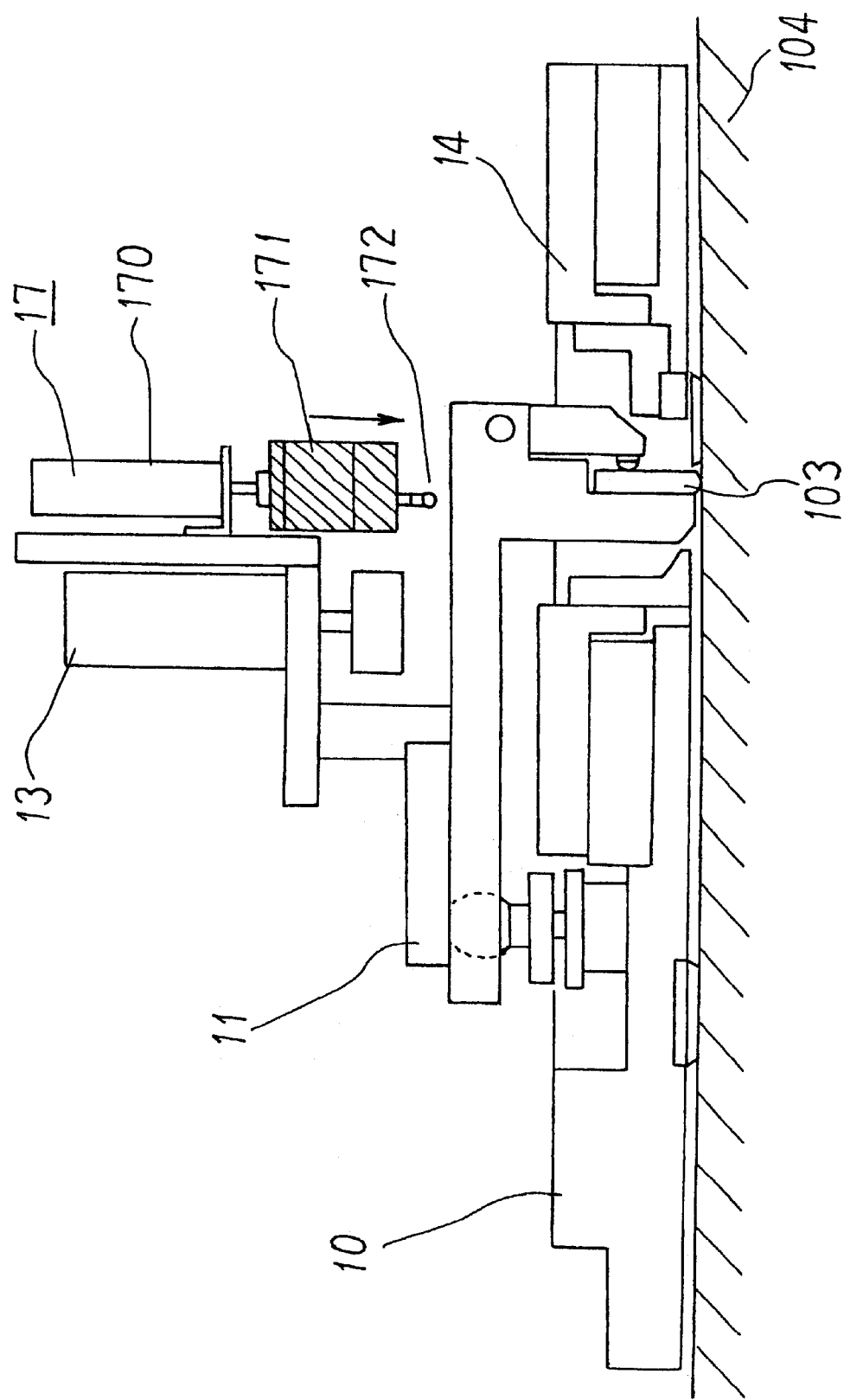
FIG. 19 is a schematic diagram depicting the bending mechanism depicted in FIG. 16.

FIG. 18 provides a cross-section view of the bending mechanism depicted in FIG. 16B, and FIG. 19 is a schematic diagram of the bending mechanism.

The row bar 101 can become warped when bonded to the work 103. Even the slightest warpage can make uniformity impossible when performing submicron order processing. To correct this warpage, the adapter 11 is equipped with a bending mechanism. As shown in FIGS. 16B and 18, the bending mechanism comprises a bending arm 115 and a bend adjustment screw 116. The bending arm 115 presses against the wall of the mounting holes 103*a* of the work 103. The bend adjustment screw 116 adjusts the pressure applied by the bending arm 115.

The bending arm 115 bends the work 103 and corrects the warp of a row bar 101 by pressing against the center of the lower wall of the mounting holes 103*a* of the work 103. The correction quantity is adjusted by turning the bend adjustment screw 116. At this point, the warpage is measured by tracing a measuring device over the row bar 101 after the row bar 101 has been bonded to the work 103. The correction quantity is then determined in accordance with the warpage.

As shown in FIG. 19, the lap base 10 is equipped with an automatic bending mechanism 17. A wrench 172 engages the bend adjustment screw 116 depicted in FIG. 18. A motor 171 rotates the wrench 172. A bending cylinder 170 drives the wrench 172 and motor 171 in the direction of the bend adjustment screw 116.

The bend adjustment screw 116 is rotated by controlling the rotation of the motor 171 in accordance with the measured warpage. This makes it possible to automatically correct for warpage.

Figure 20:
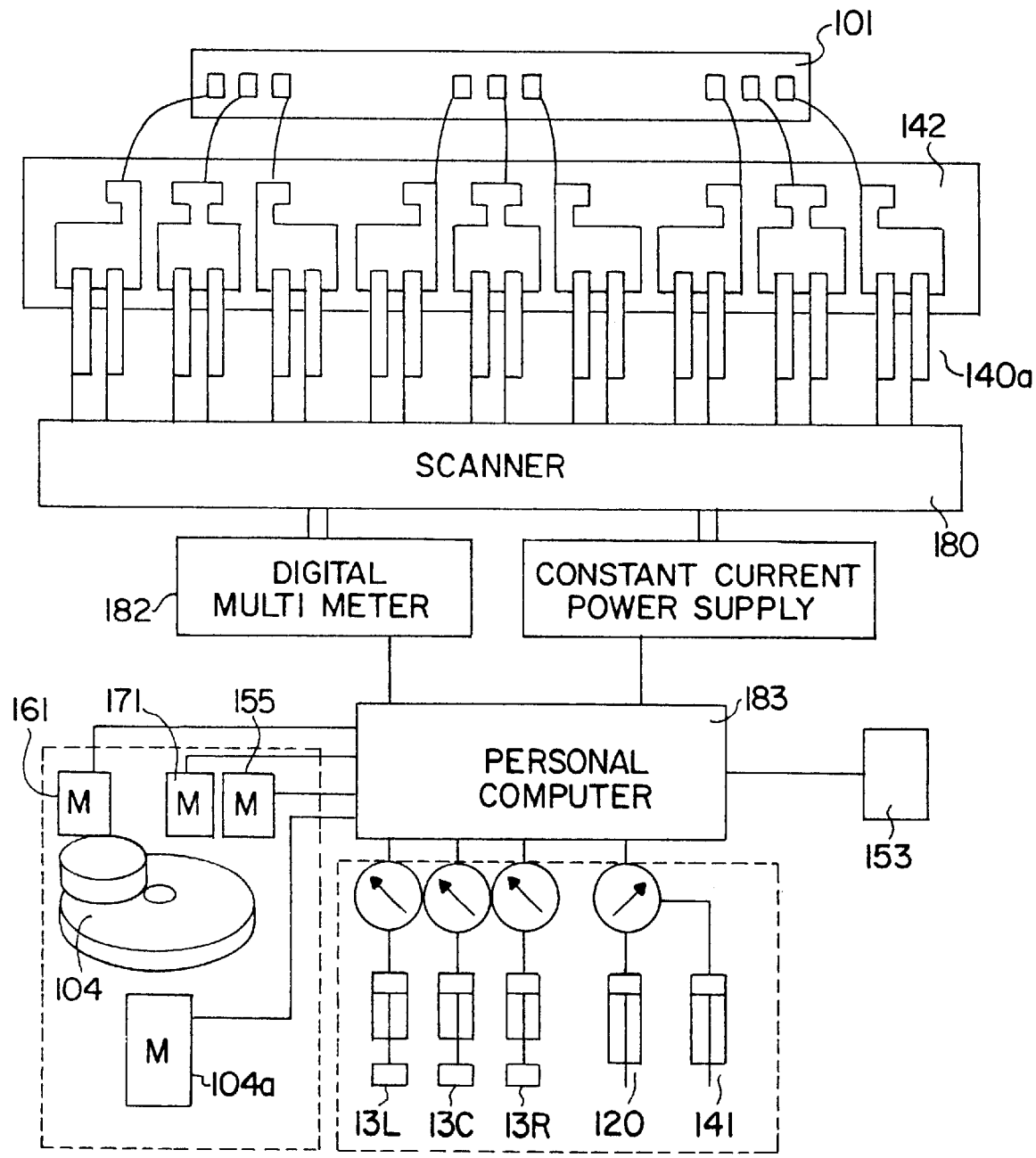
FIG. 20 is a block diagram depicting an embodiment of the present invention.
Figure 21:
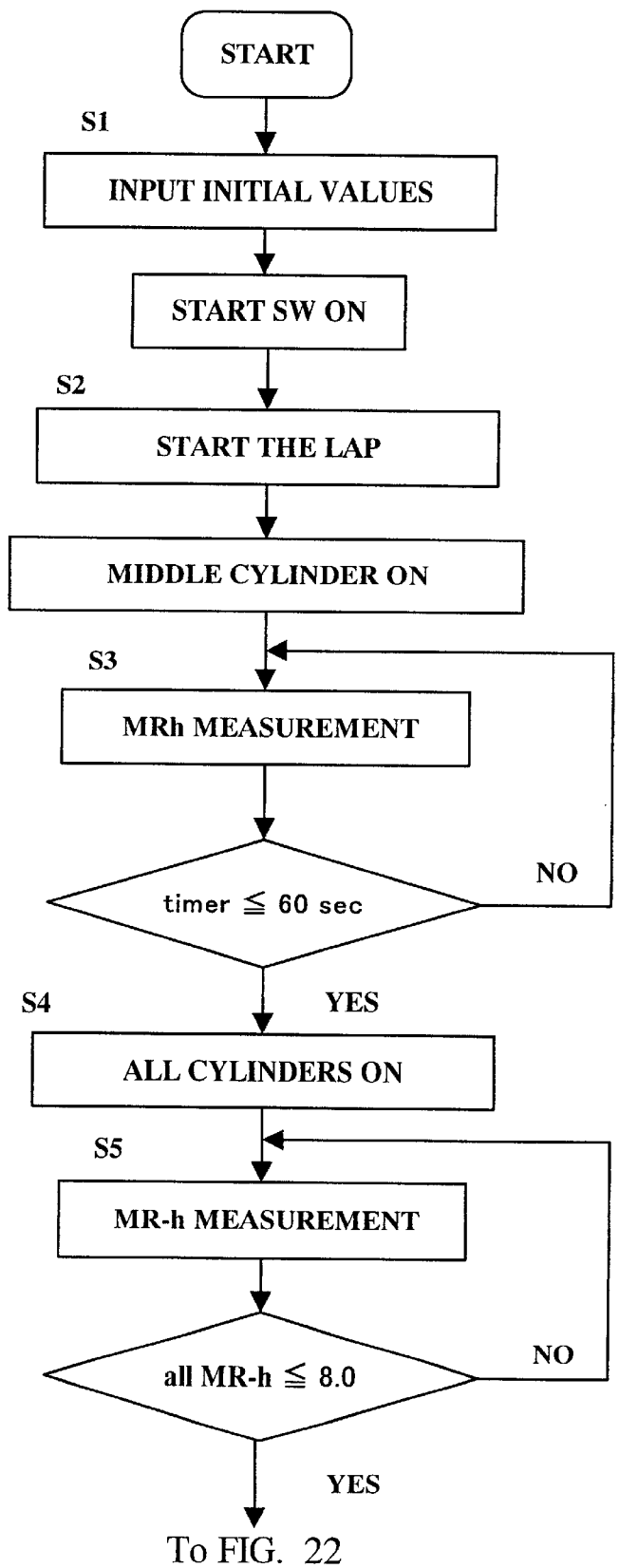
FIG. 21 provides a flow chart (Part 1) of the processing performed by an embodiment of the present invention.
Figure 22:
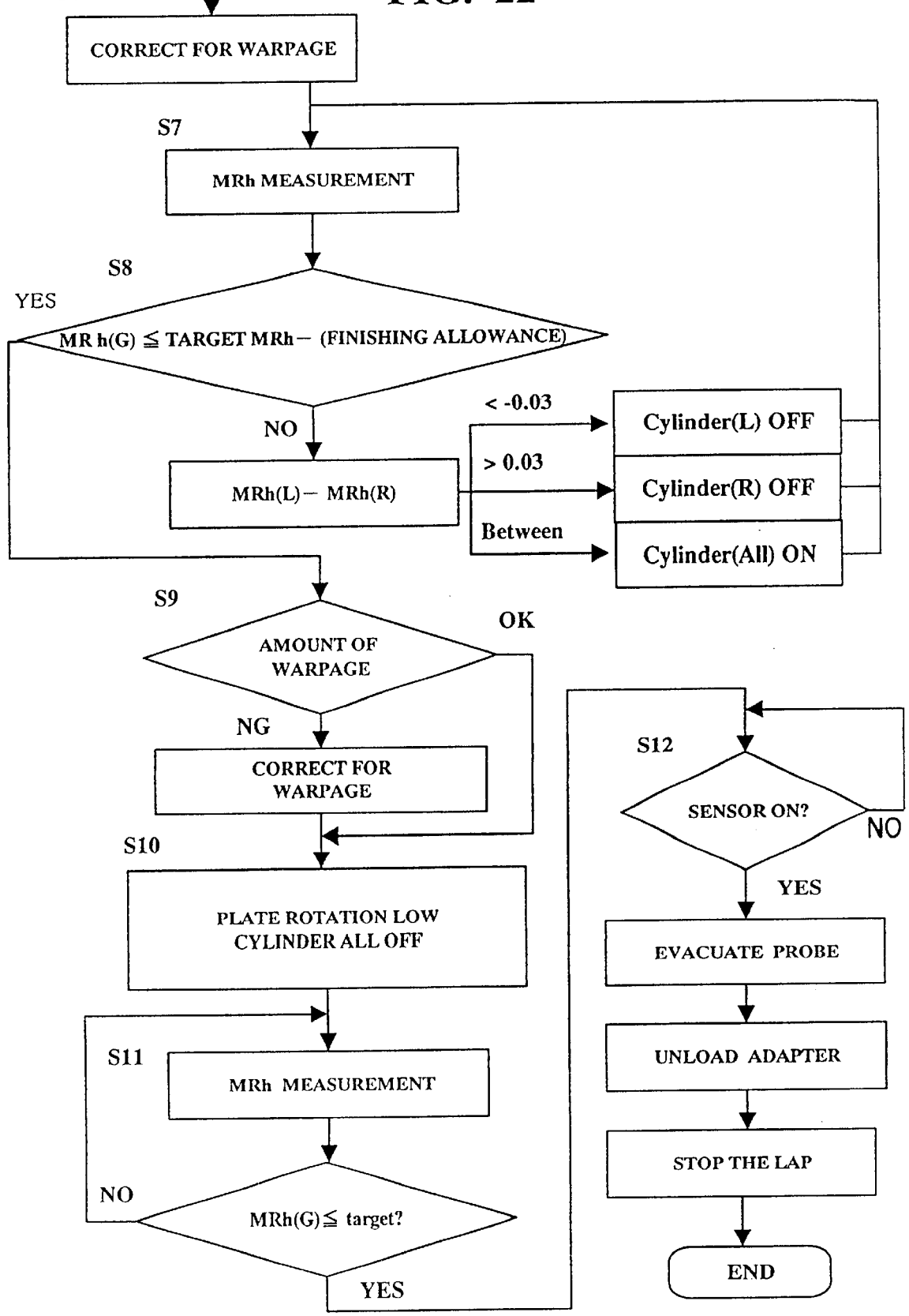
FIG. 22 provides a flow chart (Part 2) of the processing performed by an embodiment of the present invention.
Figure 23:
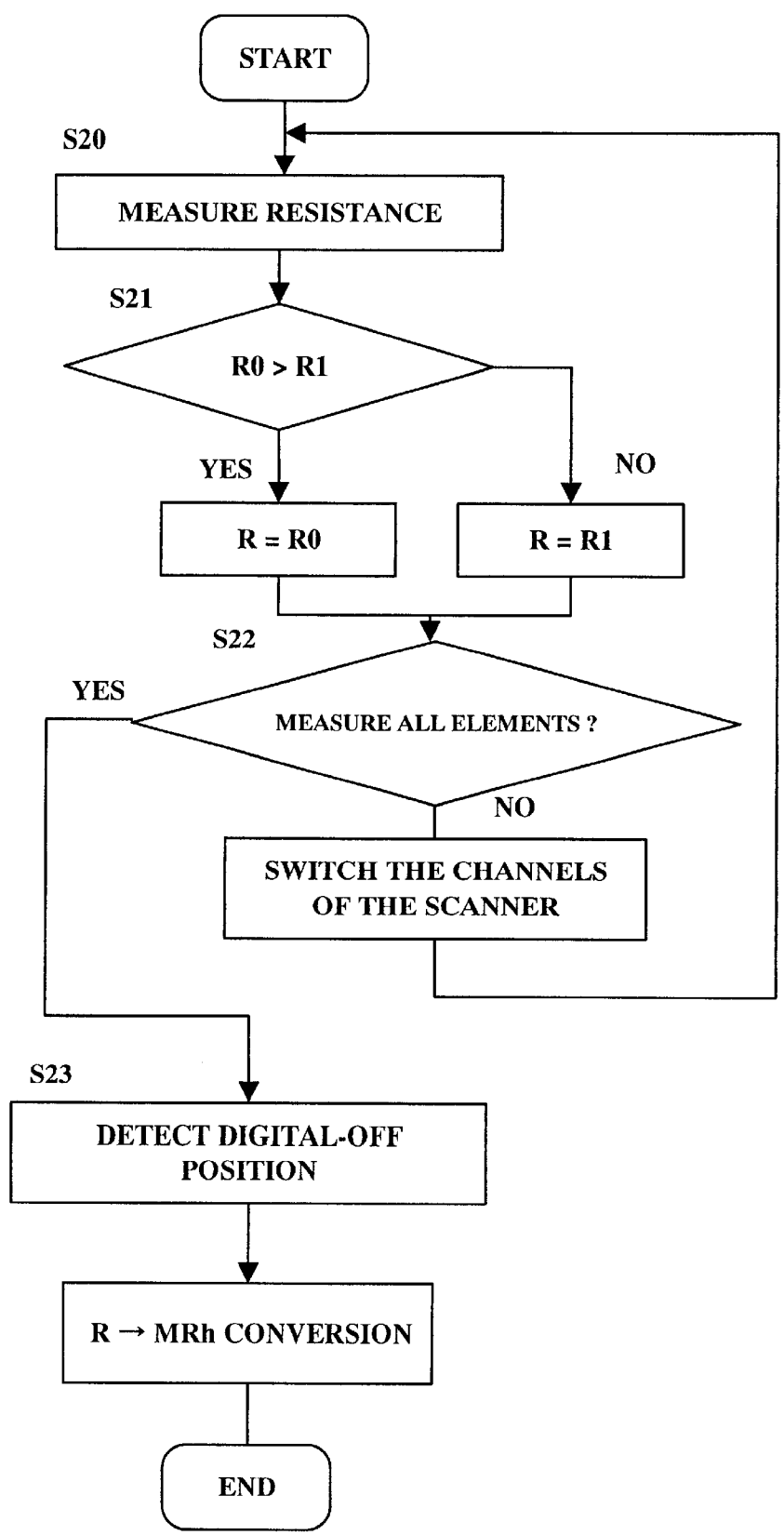
FIG. 23 provides a flow chart of the MRh measurement process listed in FIGS. 21 and 22.
Figure 24:
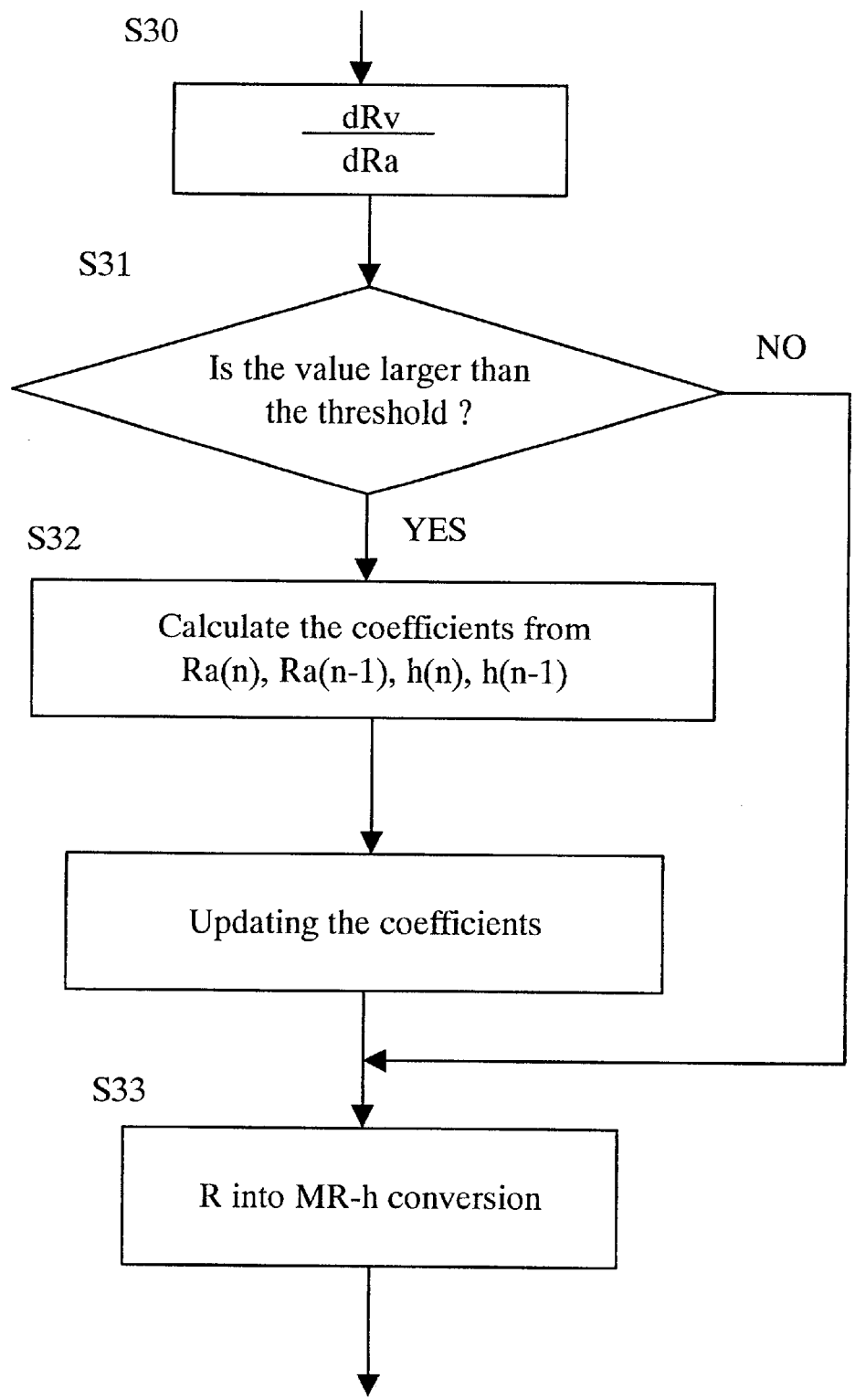
FIG. 24 provides a flow chart of the processing used to detect the digital OFF positions listed in FIG. 23.
Figure 25A:
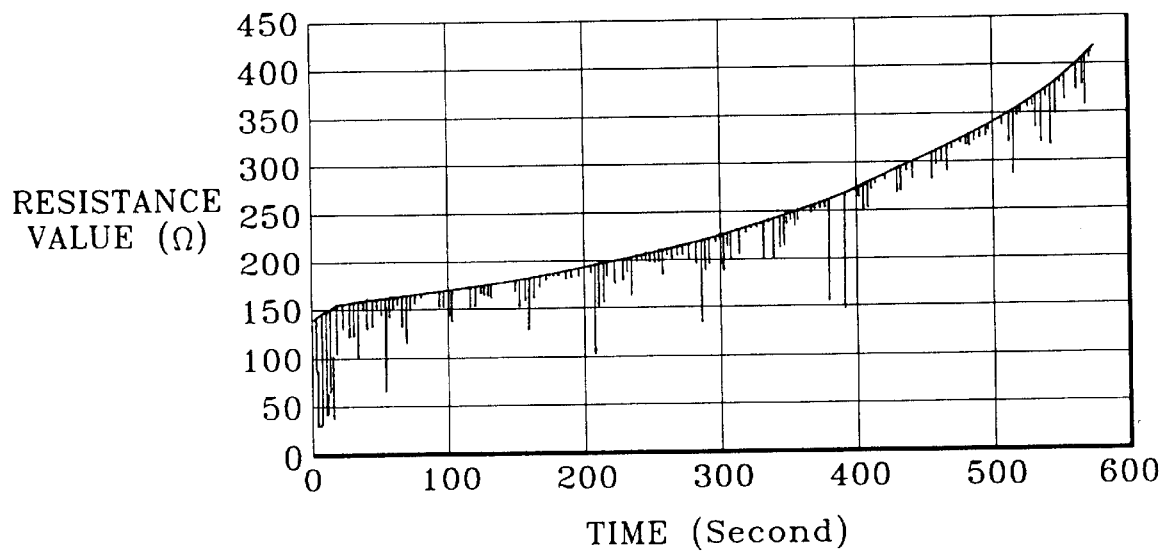
FIGS. 25A and 25B are schematic diagrams depicting the noise elimination process described with reference to FIG. 23.
Figure 25B:
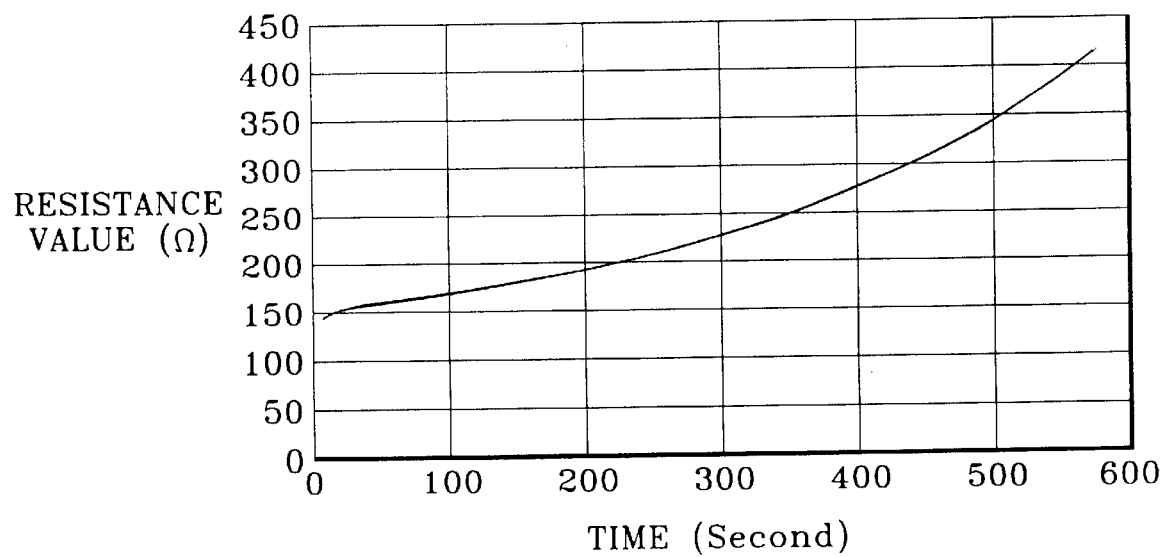
Figure 26:
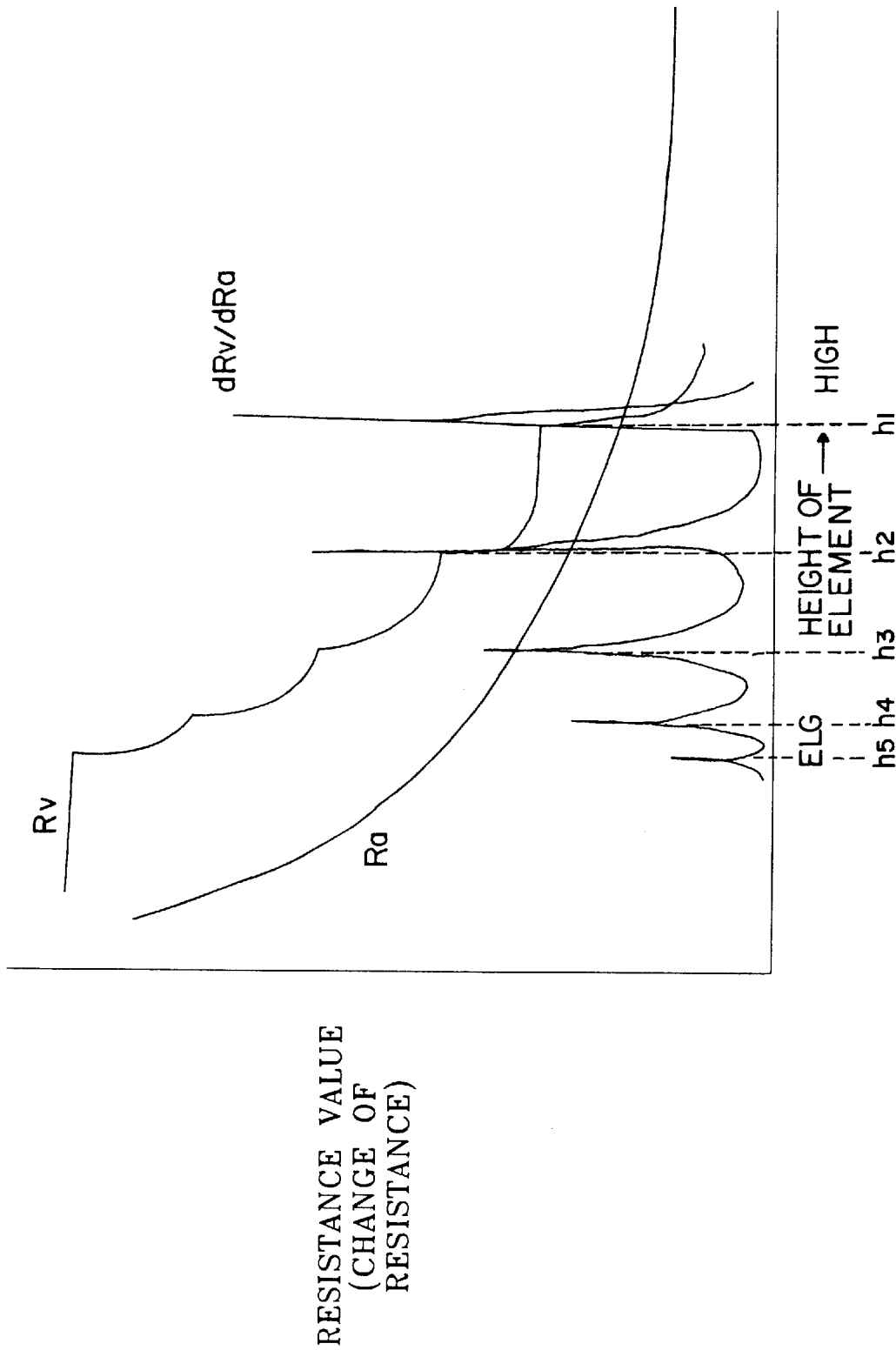
FIG. 26 is a schematic diagram depicting the digital OFF detection process charted in FIG. 24.
Figure 27A:
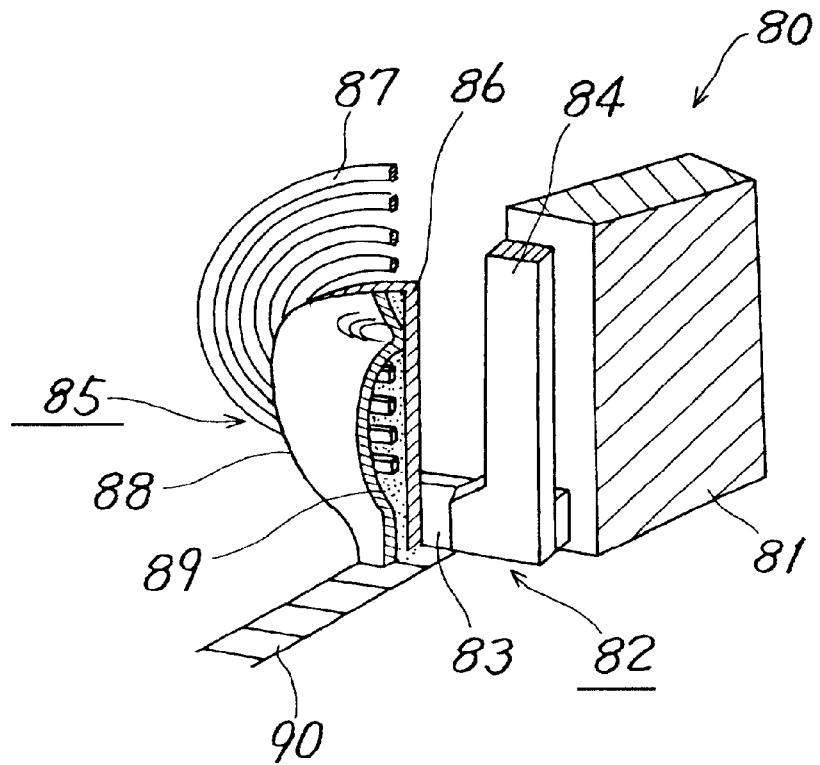
FIGS. 27A and 27B provide schematic diagrams depicting a merged magnetic head.
Figure 27B:
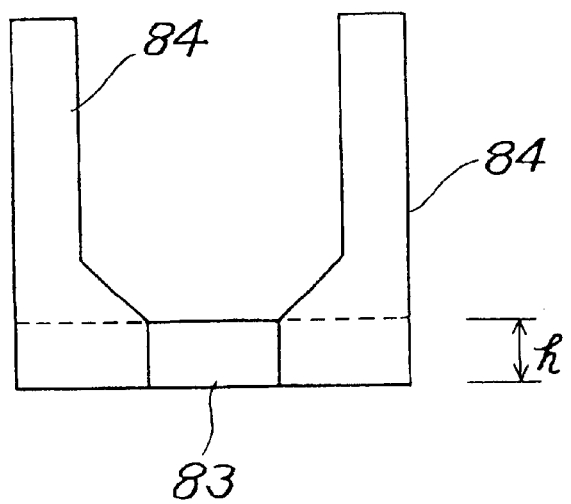
Figure 28A:
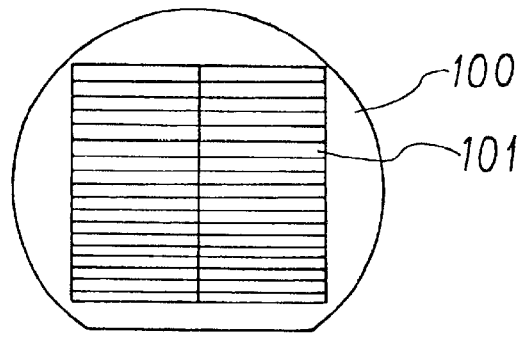
FIGS. 28A, 28B and 28C provide schematic diagrams depicting a magnetic head manufacturing process (Part 1).
Figure 28B:
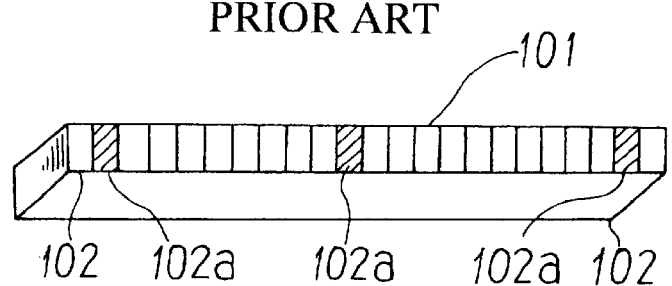
Figure 28C:
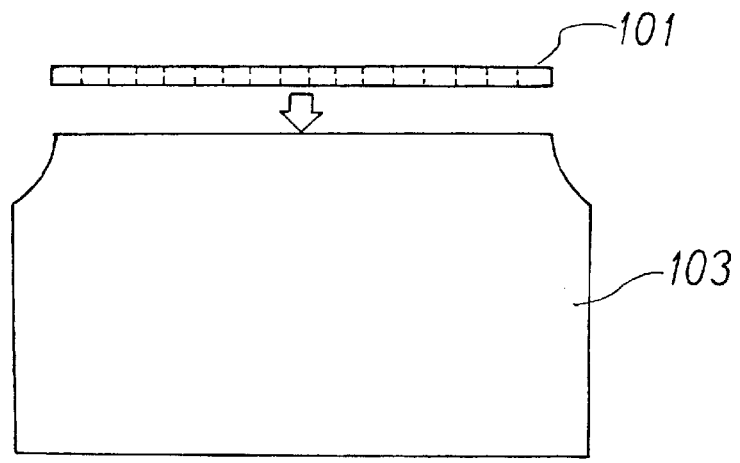
Figure 29A:
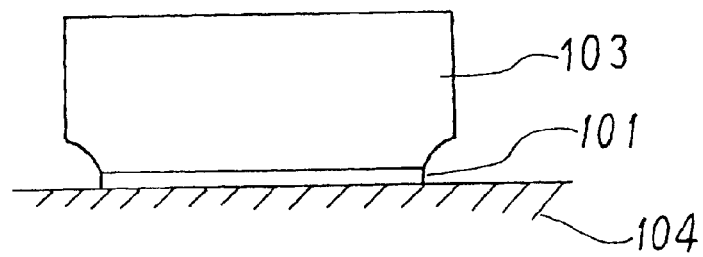
FIGS. 29A, 29B, 29C and 29D provide schematic diagrams depicting a magnetic head manufacturing process (Part 2).
Figure 29B:
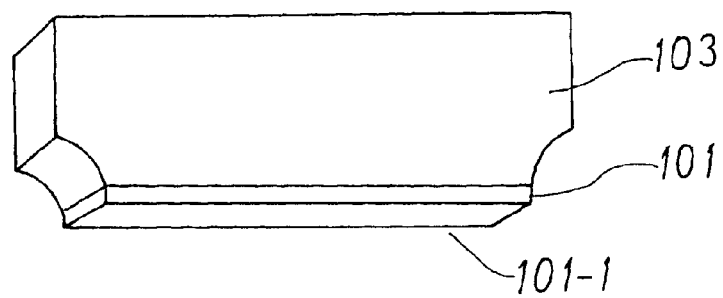
Figure 29C:
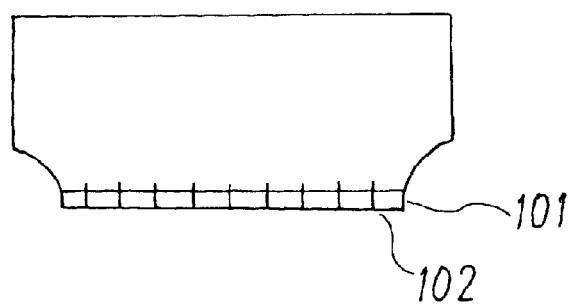
Figure 29D:
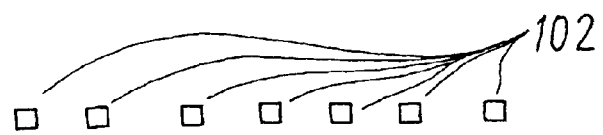
Figure 30A:
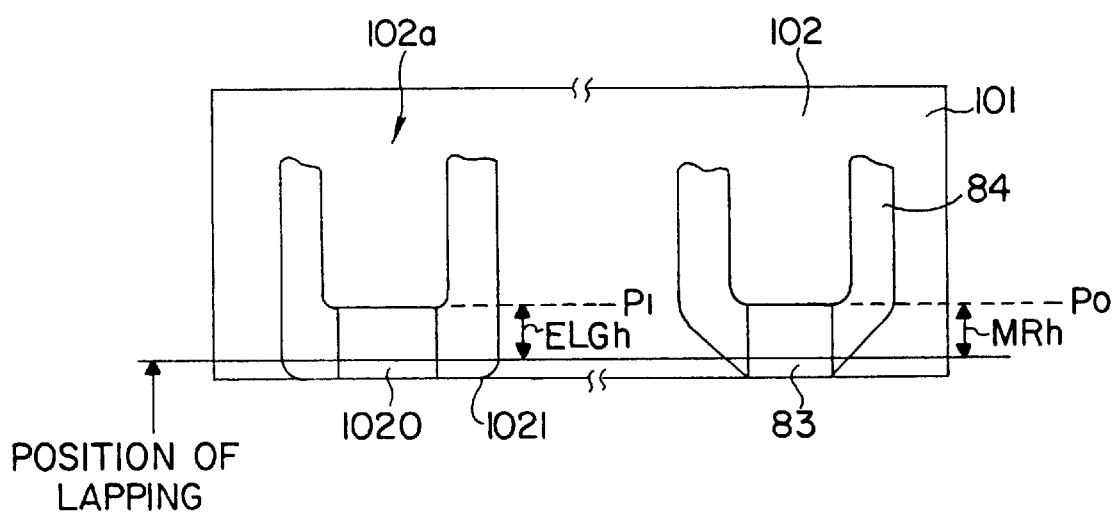
FIGS. 30A and 30B provide schematic diagrams depicting the prior art.
Figure 30B:
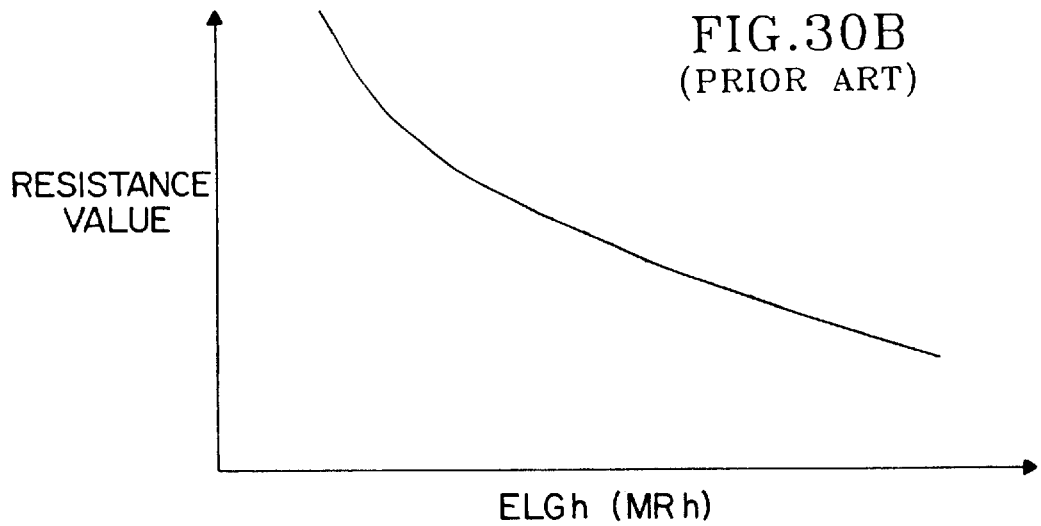

FIG. 20 is a block diagram depicting an embodiment of the present invention, FIGS. 21 and 22 provide flow charts of the processing performed by an embodiment of the present invention, FIG. 23 provides a flow chart of MRh measurement processing, FIG. 24 provides a flow chart of the processing used to detect the digital OFF position listed in FIG. 23, FIGS. 25A and 25B are schematic diagrams depicting noise elimination processing, and FIG. 26 is a schematic diagram depicting the digital OFF detection process charted in FIG. 24.

As shown in FIG. 20, a scanner 180 performs channel switching for each of the probes 140*a*. A constant-current power source 181 supplies the current for resistance measurement. A digital multimeter 182 uses the output from the scanner 180 to measure the resistance values of the analog resistance and digital resistance of each ELG element. A lap rotation motor 104*a* rotates the lap 104.

A personal computer (called a controller) 183 converts the measured resistance values from the digital multimeter 182 to magnetoresistive film height MRh, and controls all the motors. That is, the controller 183 controls the lap swing motor 155, the bending motor 171, the correction ring motor 161 and the rotation motor 104*a*. The controller 183 controls each cylinder 13L, 13C, 13R in the pressure mechanism. The controller 183 also controls the cylinder 120 in the unloading mechanism 12, and the cylinder 141 in the probe mechanism 14. Furthermore, the controller 183 also receives output from the swing sensor 153 of the swing mechanism and controls the unloading mechanism 12.

The processing performed by the controller is explained below using an input unit of FIGS. 21 and 22.

(S1) First, initial values are input using an input unit of the controller 183. Initial values include such values as the wafer number and row bar address. After that, the operator mounts the adapter 11 to the lap base 10. Then, the start switch is pressed.

(S2) When the controller 183 detects the start switch being depressed, it starts the lap. That is, the controller 183 starts the motor 104a and rotates the lap 104 at high speed. The rate of rotation at this time is 50 rpm. The controller 183 starts the swing motor 155 and controls swing operations. The controller 183 also starts the correction ring motor 161. The controller 183 commences the supply of slurry.

Then, the controller 183 turns ON the pressure mechanism's center cylinder 13C. This causes the pressure cylinder to apply a light load, and flattening (Stage 1) is carried out. This flattening process removes burrs from the row bar 101.

(S3) The controller 183 reads the resistance values from the digital multimeter 182, and measures the height MRh, as will be explained with reference to FIGS. 23 and 24. The controller 183 operates a timer when the lap starts, and determines whether or not the timer value has reached 60 seconds. If the timer value is less than 60 seconds, the controller 183 measures the height MRh. That is, flattening is performed for 60 seconds. Then, as explained earlier, height MRh measurement is also performed during this time to detect digital resistance OFF.

(S4) The controller 183 terminates the flattening process when the timer value exceeds 60 seconds. Then, the controller 183 turns ON all the cylinders 13L, 13C, 13R of the pressure mechanism 13. That is, it increases the load and subjects the work 103 to chamfering (Stage 2). This chamfering process eliminates shorts from the magnetic heads 102 and ELG elements 102a of the row bar 101.

(S5) The controller 183 reads the resistance values from the digital multimeter 182, and measures the height MRh, as will be explained with reference to FIGS. 23 and 24. The controller 183 determines whether or not the MRh of all the ELG elements, which are located on the right, in the center and on the left of the row bar 101 as explained earlier, are less than 8.0 microns. If the MRh of all the ELG elements are not less than 8.0 microns, the controller 183 measures the height MRh.

Prior to lapping, the ELG elements generate partial shorts, and their analog resistance values Ra exhibit abnormal values. Consequently, the converted height MRh also exhibits an abnormal value. When all the MRh are less than 8.0 microns, the partial shorts are eliminated, and the abnormal values are removed. This brings about a switch to process control using analog resistance values.

(S6) Once shorts have been eliminated, the controller 183 proceeds with processing that corrects for warpage and left-right differences (stage 3). That is, the controller 183 starts the bending motor 171 explained using FIG. 19, and corrects warpage. The correction quantity at this time is input to the controller 183 by the measurement operation explained earlier with reference to FIG. 19. The controller 183 controls the bending motor 171 using this correction quantity.

(S7) The controller 183 reads the resistance values from the digital multimeter 182, and measures the height MRh, as will be explained with reference to FIGS. 23 and 24.

(S8) The controller 183 detects the height MRh at the center location (center of gravity). The center location height MRh (center of gravity) is determined by finding the average value of the height of the left side ELG element and the height of the right side ELG element, and then finding the average value of this average value and the height of the center ELG element. The controller 183 determines whether or not the height MRh of the ELG element at the center position (G) is less than (the target height—the finishing allowance). When the height MRh of the ELG element at the center position (G) is not less than (the target height—the finishing allowance), it proceeds with correcting for right-left differences. That is, the controller 183 calculates the difference X between the height MRh of the left-side ELG element (L) and the height MRh of the right-side ELG element (R).

When the difference X does not exceed −0.03 microns, the right end of the row bar 101 is more than 0.03 microns (tolerance value) higher than the left end. Consequently, to lessen the load on the left end, the left cylinder 13L of the pressure mechanism 13 is turned OFF. Then, processing returns to Step S7.

Also, when the difference X exceeds 0.03 microns, the left end of the row bar 101 is more than 0.03 microns (tolerance value) higher than the right end. Consequently, to lessen the load on the right end, the right cylinder 13R of the pressure mechanism 13 is turned OFF. Then, processing returns to Step S7.

When the difference X falls between −0.03 microns and 0.03 microns, the difference between the right and left ends of the row bar 101 is within tolerances. At that point, all the cylinders 13L, 13C, 13R of the pressure mechanism 13 are turned ON, and processing returns to Step S7.

(S9) The controller 183 confirms the amount of warpage. It finds the difference Y between the height MRh of the center ELG element C and the average value of the heights MRh of the left and right ELG elements at this time. The controller 183 determines whether or not this difference Y exceeds the tolerance value of 0.03 microns. If it does not exceed this tolerance, processing jumps to Step S10. When the difference Y does exceed the tolerance value, warpage is corrected for as described in Step S6. The correction quantity at this time is determined from the above-described difference Y.

(S10) The controller 183 proceeds with the finishing process (Stage 4). The controller 183 controls the motor 104a and reduces the plate rotation rate at this time. The rate of rotation is 15 rpm. Then, the controller 183 turns all the cylinders 13L, 13C, 13 of the pressure mechanism 13 OFF. That is, finishing is performed without a load being applied.

(S11) The controller 183 reads the resistance values from the digital multimeter 182, and measures the height MRh, as will be explained with reference to FIGS. 23 and 24. The controller 183 determines whether or not the height MRh of the ELG element at the center of gravity (G) is less than the target value.

(S12) When the controller 183 detects that the height MRh (G) is less than the target value, it terminates processing. That is, the controller 183 determines whether or not the swing sensor 153 described with reference to FIG. 13 is ON. When the swing sensor 153 is ON, as explained earlier, the lap base 10 is at the center point P of its swing.

At that point, the controller 183 operates the probe cylinder 141 and evacuates the probe 140. Next, the controller 183 operates the unloading cylinder 120 of the unloading mechanism 12 and evacuates the work 103 from the lap 104. Then, the controller 183 stops the lap, and ends processing.

In this way, all processing from roughing (flattening, chamfering and right-left difference correction) through finishing is carried out continuously by changing the processing rate. Consequently, this greatly improves productivity over processes in which roughing and finishing are performed separately. It also reduces the amount of work required of the operator.

Next, MRh measurement processing is explained using FIGS. 23 and 24.

(S20) The controller 183 reads the resistance values from the digital multimeter 182. The digital multimeter 182 measures the resistance value Ra of the analog resistance 102-1 and the resistance value Rv of the digital resistance 102-2 for each ELG element 102a.

(S21) The controller 183 compares the previously-measured resistance values R0 against the resistance values measured at this time R1. This is carried out separately for analog resistance 102-1 resistance values Ra and digital resistance 102-2 resistance values Rv.

When the previously-measured resistance value R0 is. greater than the recently-measured resistance value R1, the current resistance value R uses the previous resistance value R0. When the previously-measured resistance value R0 is not greater than the recently-measured resistance value R1, the current resistance value R uses the recently-measured resistance value R1.

As explained with reference to FIG. 4B, the resistance value increases in line with the reduction of the height of an element. Therefore, if the resistance measurement operation is normal, the resistance values of the previous sampling are larger than the resistance values of the recent sampling. However, partial shorts in the elements and the effects of the abrasive can cause measured resistance values to exhibit abnormal values. This type processing is performed to eliminate these abnormal resistance values.

The measured resistance value depicted in FIG. 25A includes noise (abnormal resistance value). The noise is removed, as shown in FIG. 25B, by noise elimination processing. Consequently, an accurate resistance value is obtained. Since this operation is carried out separately for analog resistance 102-1 resistance values Ra and digital resistance 102-2 resistance values Rv, it is possible to obtain noise-less resistance values for each type of resistance.

(S22) The controller 183 determines whether or not the resistance values of all the ELG elements have been measured. If the resistance values of all the ELG elements have yet to be measured, the controller 183 switches the channels of the scanner 180 and returns to Step S20.

(S23) When the controller 183 finishes with the resistance values of all the ELG elements, as will be explained later with reference to FIG. 24, it detects digital resistance element OFF from changes in the resistance values. When it detects digital resistance value OFF, the controller 183 computes the coefficients for the above-described conversion equation, Equation (3). Then, in accordance with that equation, it converts the measured resistance value Ra to the height MRh. Then it ends processing.

The operation for detecting digital OFF positions is explained with reference to FIG. 24.

(S30) The controller 183 detects the digital resistance 102-2 OFF positions by detecting changes in the resistance value of the digital resistance 102-2. Consequently, the controller 183 differentiates the digital resistance value Rv from the analog resistance value Ra. The differential equation is as shown below.

$$dRv/dRa=[Rv(n)-Rv(n-1)]/[Ra(n)-Ra(n-1)] \quad (5)$$

Further, Rv (n) is the digital resistance value for the n sampling, and Rv (n-1) is the digital resistance value for the (n-1) sampling, Ra (n) is the analog resistance value for the n sampling, and Ra (n-1) is the analog resistance value for the (n-1) sampling.

As shown in FIG. 26, the resistance value Ra of the analog resistance 102-1 changes suddenly as the height of the ELG element 102a decreases. The physical relationship of the analog resistance 102-1 and the digital resistance 102-2 is fixed. Therefore, a large differential value can be obtained in the digital resistance OFF positions by differentiating the digital resistance value Rv from the analog resistance value Ra. This makes it possible to detect the exact point where digital resistance went OFF. It also facilitates this detection.

(S31) The controller 183 compares the differential value dRv/dRa to a predetermined threshold value. If the differential value is larger than the threshold value, it detects the digital resistance OFF position. Then, it proceeds to Step S32. If the differential value is not larger than the threshold value, the controller 183 determines that it is not the digital resistance OFF position, and proceeds to Step S33.

(S32) When the controller 183 detects the digital resistance OFF position, it corrects the coefficients of relational expression (3). At this point, the relational expression (3) coefficients are set in advance to the relational expression coefficients that used the initial resistance value explained previously with reference to FIG. 9 as the initial value. This, as explained earlier, inputs the initial resistance value into the controller 183. The initial resistance value is then read out using the address of that row bar. The controller 183 determines the initial coefficients from this initial resistance value.

Two OFF positions are required to correct the coefficients a,b of relational expression (3). For example, when the controller 183 detects OFF position h (n), it determines the coefficients a,b from OFF position h (n), OFF position h (n-1), the analog resistance value Ra (n) of OFF position h (n) and the analog resistance value Ra (n-1) of OFF position h (n-1).

That is, the following two expressions are obtained from relational expression (1).

$$Ra\ (n-1)=a/h\ (n-1)+b \quad (6)$$

$$Ra\ (n)=a/h\ (n)+b \quad (7)$$

Solving for the coefficients in expressions (6) and (7) produces the following two expressions.

$$a=[Ra(n)-Ra(n-1)]\cdot h(n)\cdot h(n-1)/[h(n)-h(n-1)] \quad (8)$$

$$b=a/h(n)-Ra(n) \quad (9)$$

The coefficients are then updated.

(S33) The controller 183 converts the analog resistance value Ra to the height MRh of the magnetoresistive film 83.

Relational expression (1) can be transformed as follows.

$$ELGh=(Ra-b)/a \quad (10)$$

Expression (10) shown here can be transformed to the following expression.

$$MRh=(ELGh)-\Delta l=(Ra-b)/a-\Delta l \quad (11)$$

This expression produces the correct magnetoresistive film 83 height.

This $\Delta l$, as explained with reference to FIG. 8, is input into the controller 183 for every row bar. Therefore, the corresponding differences $\Delta l$ are read out by row bar address as explained above.

After forming on a wafer a plurality of magnetic head elements 102 and monitoring elements 102a, incorporating analog resistance, the resistance value of which changes in analog fashion in line with the processing of the magnetic head elements 102, a block 101 of a plurality of magnetic heads 102 and monitoring elements 102a lined up linearly is cut from the wafer. Then, the height of the magnetic head elements 102 is processed to a prescribed height while measuring the resistance values of the monitoring elements 102a in the block 101, and after processing is complete, the block 101 is divided into individual magnetic heads 102.

Then, the difference ΔI between the positions of the ends of the monitoring elements 102a and the ends of the magnetic head elements 102 are measured, and the difference ΔI between these positions is incorporated into a relational expression that converts the resistance value of the monitoring elements 102a to the height of the magnetic head elements 102. Consequently, an accurate magnetoresistive film height can be obtained even when the resistance values of the ELG elements are converted to the height of the magnetoresistive film. The post-processing height of the magnetoresistive film can be made exactly uniform.

Further, the formation step comprises a process for fabricating a bottom shield layer 91 on the wafer substrate 100, a process for fabricating an insulation layer 92 on the bottom shield layer 91, and a process for fabricating the magnetoresistive film 83 of magnetic head elements 102 and monitoring elements 102a on the insulation layer 92.

Because the monitoring elements 102a are also fabricated on the substrate 100 through the shield layer 91, the distance from the stepper to the monitoring elements 102a and the distance from the stepper to the magnetoresistive film 83 of the magnetic head elements 102 are equivalent. Consequently, the pattern formation accuracy is the same for both the monitoring elements 102a and the magnetic head elements 102. This reduces the difference between the position P0 of the end of the magnetoresistive film 83 and the position P1 of the end of the resistance film 1020. Therefore, an accurate magnetoresistive film height is obtained even though the resistance values of the ELG elements are converted to the height of the magnetoresistive film. Consequently, it is possible to achieve precision uniformity of height of the magnetoresistive film following processing.

In addition to the above-described embodiment, the present invention can also be transformed as follows.

(1) In the above-described embodiment, the example of the ELG elements used made use of analog resistance and digital resistance, but the present invention can also be applied to ELG elements that only use analog resistance.

(2) Another form of lapping machine can also be used.

The present invention has been explained using embodiments, but various forms are possible within the scope of the objects of the present invention, and these forms are not excluded from the scope of the present invention.

As explained above, the following effects are achieved by the present invention.

(1) The difference ΔI between the positions of the ends of the monitoring elements 102a and the ends of the magnetic head elements 102 are measured, and the difference ΔI between these positions is incorporated into a relational expression that converts the resistance value of the monitoring elements 102a to the height of the magnetic head elements 102. Consequently, an accurate magnetoresistive film height can be obtained even when the resistance values of the ELG elements are converted to the height of the magnetoresistive film.

(2) Because the monitoring elements 102a are also fabricated on the substrate 100 through the shield layer 91, the distance from the stepper to the monitoring elements 102a and the distance from the stepper to the magnetoresistive film 83 of the magnetic head elements 102 are equivalent. Consequently, the pattern formation accuracy is the same for both the monitoring elements 102a and the magnetic head elements 102. Therefore, an accurate magnetoresistive film height is obtained even though the resistance values of the ELG elements are converted to the height of the magnetoresistive film.

What is claimed is:

1. A magnetic head manufacturing method for manufacturing magnetic heads, comprising:

a step for forming a plurality of magnetic head elements for utilizing a magnetic recording and at least one monitoring element for monitoring a height of said magnetic head elements on a wafer, said monitoring element includes an analog resistance, by which resistance values change in analog fashion in line with a processing of said magnetic head elements;

a step for cutting from said wafer a block in which said plurality of magnetic head elements and said monitoring element are lined up linearly;

a step for processing the height of said magnetic head elements to a prescribed height while measuring the resistance value of said monitoring element in said block; and a step for dividing said block into individual magnetic heads, wherein said forming step includes a step for measuring a positional difference between a measured position of an end of said formed monitoring element and a measured position of an end of said formed magnetic head elements, said forming step occurring prior to said processing step, said processing step includes:
a step for converting the measured resistance value of said monitoring element to a height of said monitoring element;
a step for calculating the height of said magnetic head element based on said measured positional difference and said converted height of the monitoring element; and
a step for terminating said processing when the calculated height of said magnetic head elements reaches a target value.

2. The magnetic head manufacturing method according to claim 1, said forming step includes a step for forming said magnetic head elements containing magnetoresistive elements; and said processing step includes a step for processing the height of said magnetoresistive element to said target value.

3. The magnetic head manufacturing method according to claim 2, wherein said forming step further includes a step for forming said magnetoresistive element and said monitoring element on said wafer; and a step for forming write elements on said magnetoresistive elements after said measuring step.

4. The magnetic head manufacturing method according to claim 1, wherein said forming step further includes a step for measuring an initial resistance value of said monitoring element; and said conversion step of said processing step includes a step for determining a coefficient of a relational expression that converts the measured resistance value of said monitoring element to the height of said monitoring element using said initial resistance value of said monitoring element.

5. The magnetic head manufacturing method according to claim 1, wherein said forming step further comprises a step for forming said magnetic head elements and said monitoring element, said monitoring element includes said analog resistance and a digital resistance that changes the resistance value to a bent line shape in line with the processing of said magnetic head elements; and said conversion step in said processing step includes a step for detecting a OFF state of said digital resistance in said monitoring element; and a step for correcting a coefficient of a relational expression that converts the measured resistance value of said monitoring element to the height of said monitoring element using the resistance value of said analog resistance when said digital resistance OFF is detected.

6. The magnetic head manufacturing method according to claim 1, wherein said measuring step in said forming step further comprises a step for optically measuring the positional difference between the end of said formed monitoring element and the end of said formed magnetic head elements.

7. The magnetic head manufacturing method according to claim 1, wherein said processing step further comprises a step for processing the height of said magnetic head elements by lapping said block.

8. A magnetic head manufacturing method for manufacturing magnetic heads, comprising:

a step for forming a plurality of magnetic head elements for utilizing a magnetic recording and at least one monitoring element for monitoring a height of said magnetic head elements on a wafer, said monitoring element includes an analog resistance by which resistance values change in analog fashion in line with a processing of said magnetic head elements;

a step for cutting from said wafer a block in which said plurality of magnetic head elements and said monitoring element are lined up linearly;

a step for processing the height of said magnetic head elements to a prescribed height while measuring the resistance value of said monitoring element in said block; and a step for dividing said block into individual magnetic heads, wherein said forming step includes a step for measuring a positional difference between a measured position of an end of said formed monitoring element and a measured position of an end of said formed magnetic head elements, said forming step occurring prior to said processing step, said processing step includes:

a step for converting the measured resistance value of said monitoring element to a height of said monitoring element; and a step for terminating said processing when the height of said magnetic head element reaches the prescribed height based on said measured positional difference and said converted height of the monitoring element.

9. A lapping method for lapping a height of a magnetic head element to a prescribed height, comprising:

a step of measuring a positional difference between a measured position of an end of a monitoring element and a measured position of an end of a magnetic head element for utilizing a magnetic recording formed on a base, said monitoring element including an analog resistance for monitoring a height of said magnetic head element;

a step of lapping said base while measuring the resistance value of said monitoring element in said base, said lapping step occurring after said measuring step; and a step of converting the measured resistance value of said monitoring element to a height of said monitoring element;

a step of terminating said lapping when the height of said magnetic head element reaches the prescribed height based on said measured positional difference and said converted height of the monitoring element.

* * * * *